US012608255B2

(12) United States Patent (10) Patent No.: US 12,608,255 B2
Fu et al. (45) Date of Patent: Apr. 21, 2026

(54) METHODS AND APPARATUSES FOR SELECTING FAULT MANAGEMENT MODELS

(71) Applicant: Telefonaktiebolaget LM Ericsson (publ), Stockholm (SE)

(72) Inventors: Chunyan Fu, Pointe-Claire (CA); Catherine Truchan, Lorraine (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 6 days.

(21) Appl. No.: 18/688,459

(22) PCT Filed: Sep. 2, 2021

(86) PCT No.: PCT/IB2021/058014
§ 371 (c)(1),
(2) Date: Mar. 1, 2024

(87) PCT Pub. No.: WO2023/031650
PCT Pub. Date: Mar. 9, 2023

(65) Prior Publication Data
US 2025/0068495 A1 Feb. 27, 2025

(51) Int. Cl.
*G06F 11/00* (2006.01)
*G06F 8/60* (2018.01)
*G06F 11/07* (2006.01)

(52) U.S. Cl.
CPC ............ *G06F 11/0709* (2013.01); *G06F 8/60* (2013.01); *G06F 11/0787* (2013.01)

(58) Field of Classification Search
CPC ............... G06F 11/0709; G06F 11/079; G06F 11/2263; G06F 11/2273; G06F 11/3672; G06F 11/3676
See application file for complete search history.

(56) References Cited

U.S. PATENT DOCUMENTS

2014/0047085 A1   2/2014  Peters et al.
2018/0032405 A1*  2/2018  Chen ................... G06F 11/1451
(Continued)

FOREIGN PATENT DOCUMENTS

WO      2021025694 A1    2/2021

OTHER PUBLICATIONS

International Search Report and Written Opinion dated Nov. 29, 2022 for International Application No. PCT/IB2021/058014 filed Sep. 2, 2021; consisting of 10 pages.
(Continued)

*Primary Examiner* — Philip Guyton
(74) *Attorney, Agent, or Firm* — Weisberg I.P. Law, P.A.

(57) ABSTRACT

Embodiments described herein provide methods and apparatuses for selecting $N_{next}$ Fault Management Models, FMMs, where $N_{next}$ is an integer value, to run at an edge site in a cloud system during an $i^{th}$ time period. A method in a Fault Management System, FMS includes: in a deployment agent, DA: selecting the $N_{next}$ FMMs from a first set of FMMs based at least in part on respective probability functions associated with each of the first set of FMMs, wherein each respective probability function indicates how likely a fault associated with the respective FMM is to occur as a function of time; and initiating running of the $N_{next}$ FMMs at the edge site during the $i^{th}$ time period.

17 Claims, 13 Drawing Sheets

100

(56)                    References Cited

U.S. PATENT DOCUMENTS

| | | | |
|---|---|---|---|
| 2019/0156246 A1 | 5/2019 | Kuo et al. | |
| 2019/0370218 A1 | 12/2019 | Di Pietro et al. | |
| 2020/0036510 A1* | 1/2020 | Gomez | H04L 9/008 |
| 2020/0250585 A1 | 8/2020 | Liu et al. | |
| 2020/0272859 A1 | 8/2020 | Iashyn et al. | |
| 2020/0327371 A1* | 10/2020 | Sharma | H04L 67/34 |
| 2020/0327392 A1* | 10/2020 | Bleiweiss | G06N 3/044 |
| 2020/0356415 A1 | 11/2020 | Goli | |
| 2020/0401891 A1* | 12/2020 | Xu | G06N 3/08 |
| 2022/0214998 A1* | 7/2022 | Mutnuru | H04L 41/0816 |
| 2023/0125626 A1* | 4/2023 | Vanbrabant | G06F 9/45558 |
| | | | 718/1 |
| 2024/0354567 A1* | 10/2024 | Duggal | G06N 3/006 |
| 2025/0068495 A1* | 2/2025 | Fu | G06F 11/0793 |

OTHER PUBLICATIONS

He, Z., et al., Statistical Modeling and Analysis of Hard Disk Drives (HDDs) Failure, 2012 Digest APMRC, Singapore, 2012, consisting of 2 pages.

Salah Farrag, A.A., et al., Intelligent Cloud Algorithms for Load Balancing problems: A Survey, 2015 IEEE Seventh International Conference on Intelligent Computing and Information Services (ICICIS'15); Cairo, Egypt, 2015, consisting of 7 pages.

Mirjalili, S., The Ant Lion Optimizer, Advances in Engineering Software, vol. 83, 2015, consisting of 19 pages.

Zhan, Z., et al., Cloud Computing Resource Scheduling and a Survey of Its Evolutionary Approaches, ACM Computing Surveys, vol. 47, No. 4, Article 63, Jul. 2015, consisting of 33 pages.

Soualhia, M., et al., Infrastructure Fault Detection and Prediction in Edge Cloud Environments, In Proceedings of the 4th ACM/IEEE Symposium on Edge Computing (SEC '19). Association for Computing Machinery, Nov. 7-9, 2019, Arlington, VA, consisting of 14 pages.

Du, M., et al., DeepLog: Anomaly Detection and Diagnosis from System Logs through Deep Learning, In Proceedings of the 2017 ACM SIGSAC Conference on Computer and Communications Security (CCS '17), Oct. 30-Nov. 3, 2017, Dallas, TX, USA, consisting of 14 pages.

Kaufman, L.M., et al., Using Statistics of the Extremes for Software Reliability Analysis, IEEE Transactions on Reliability, vol. 48, No. 3, Sep. 1999, consisting of 8 pages.

Wuhib, F., et al., Intelligent edge management: why AI and ML are key players, Ericsson Blog, Intelligent edge computing and management—Ericsson, Apr. 14, 2021, consisting of 11 pages.

Abualigah, L., et al., A novel hybrid antlion optimization algorithm for multi-objective task scheduling problems in cloud computing environments, Cluster Computing (2021), Springer Science+ Business Media, LLC, part of Springer Nature 2020, Published online: Mar. 12, 2020, consisting of 19 pages.

\* cited by examiner

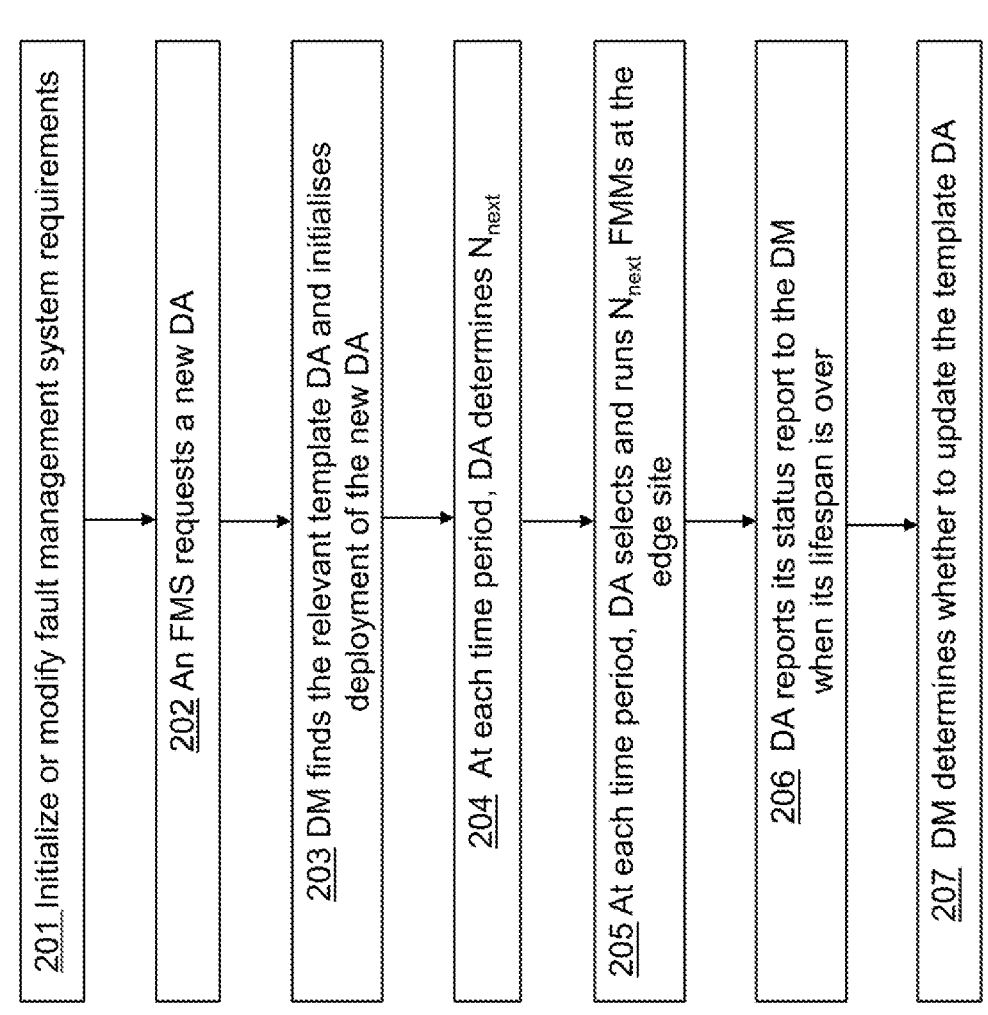

Figure 2

201 Initialize or modify fault management system requirements

202 An FMS requests a new DA

203 DM finds the relevant template DA and initialises deployment of the new DA

204 At each time period, DA determines $N_{next}$

205 At each time period, DA selects and runs $N_{next}$ FMMs at the edge site

206 DA reports its status report to the DM when its lifespan is over

207 DM determines whether to update the template DA

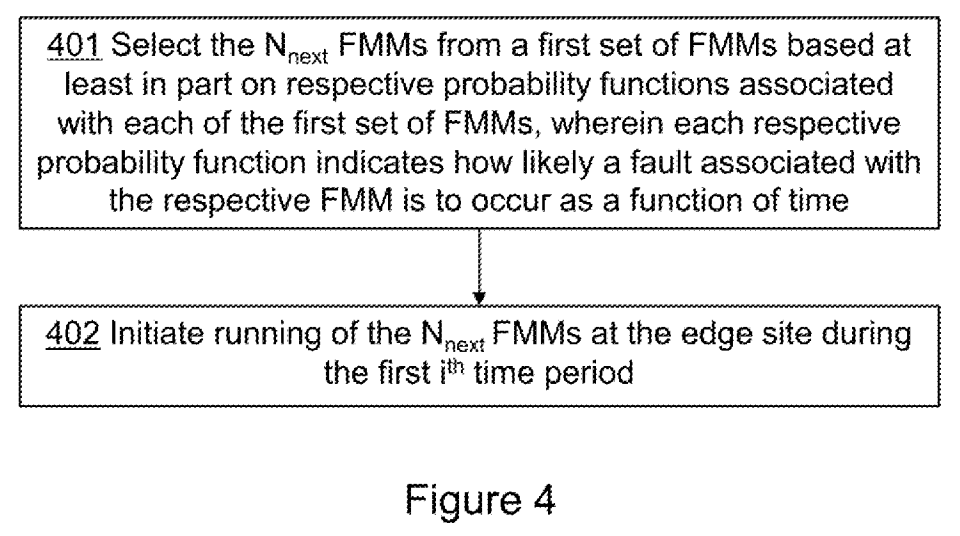

401 Select the $N_{next}$ FMMs from a first set of FMMs based at least in part on respective probability functions associated with each of the first set of FMMs, wherein each respective probability function indicates how likely a fault associated with the respective FMM is to occur as a function of time 402 Initiate running of the $N_{next}$ FMMs at the edge site during the first $i^{th}$ time period

Figure 4

Tr_violation(PTr =80%,   ARr =70%)

603 Define a new update with parameters: pof(N)=N*PTr/ATr

604 For each edge site: start Update_DA(edge_site_id, pof(N))

Resource_violation(PRu=5%, ARu=7%)

601 Define a new update with parameters: pof(N)=N*PRu/ARu

602 For each edge site: start Update_DA(edge_site_id, pof(N))

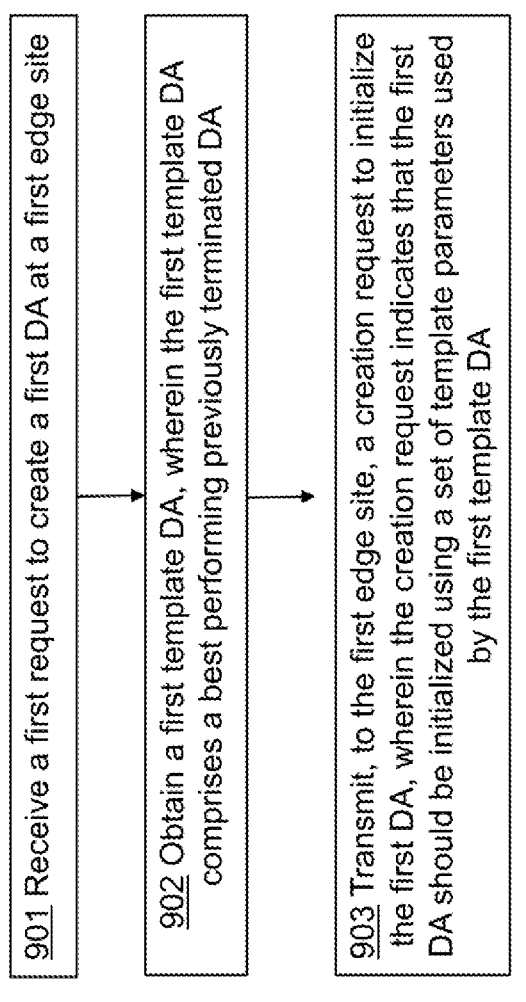

901 Receive a first request to create a first DA at a first edge site

902 Obtain a first template DA, wherein the first template DA comprises a best performing previously terminated DA 903 Transmit, to the first edge site, a creation request to initialize the first DA, wherein the creation request indicates that the first DA should be initialized using a set of template parameters used by the first template DA

Figure 9

METHODS AND APPARATUSES FOR SELECTING FAULT MANAGEMENT MODELS

CROSS-REFERENCE TO RELATED APPLICATION

This application is a Submission Under 35 U.S.C. § 371 for U.S. National Stage Patent Application of International Application Number: PCT/IB2021/058014, filed Sep. 2, 2021 entitled "METHODS AND APPARATUSES FOR SELECTING FAULT MANAGEMENT MODELS," the entirety of which is incorporated herein by reference.

TECHNICAL FIELD

Embodiments described herein relate to methods and apparatuses for selecting Fault Management Models to run at an edge site in a cloud system.

BACKGROUND

Conventional Fault Management Systems (FMSs) are usually deployed when a network infrastructure is built. The deployment decisions may be made upon the initial planning. If the infrastructure of the network changes, e.g., by adding a host device or removing a network device, it usually requires a manual reconfiguration of the FMS. Such a solution does not meet the requirements of edge cloud system fault management, which can be a heterogeneous, large scale system with high dynamicity. There may therefore be a need for a more flexible scheme in order to cope with these challenges.

Machine learning (ML) techniques are being used more often in Fault Management (FM). For example, an operator can train a model (e.g., Long Short-Term Memory (LSTM)) to detect a fault when the input data deviates from the trained data, or use a model (e.g., Convolutional Neural Network) to predict a 'known' recurrent fault that follows patterns or trends. An operator may also use causal models (e.g., a Bayesian network) for root cause analysis, and/or use Reinforcement Learning (RL) schemes for making various remedying decisions.

Such ML techniques may be used to significantly automate and facilitate the FM tasks. However, the increasing number of models that may be required may introduce non-trivial costs, such as computing resources, data storages and in some cases network resources (if data needs to be transferred remotely). For instance, in some cases it may be necessary to run ML models online in order to obtain timely inferencing. In such a case, a fault detection or prediction model requires the processing of online monitoring data samples and fitting the samples and outputting inferences in a near real time manner. Such online inferencing usually consumes more computational resources than those consumed by the traditional threshold-based FM methods.

In addition, if a model is trained to detect, predict or prevent a specific type of fault, it may be that an ensemble of models are required at the same time in order to address all possible faults. This may be very resource consuming, and for a resource-constrained edge site (e.g., in a cloud environment), it may become impossible. On the other hand, faults are usually corner cases in a telco-grade edge cloud system, and it may not be considered efficient to always run all the ML models at the same time for management tasks. In other words, it may be beneficial for an operator to minimize the overhead of the FM system to save the cost whilst at the same time to effectively prevent system failures that could cause revenue losses.

Thus, there is a need for optimizing decisions when deploying FMSs in the edge sites of a cloud system.

SUMMARY

According to some embodiments there is provided a method for selecting $N_{next}$ Fault Management Models, FMMs, where $N_{next}$ is an integer value, to run at an edge site in a cloud system during an $i^{th}$ time period. The method comprises: in a deployment agent, DA: selecting the $N_{next}$ FMMs from a first set of FMMs based at least in part on respective probability functions associated with each of the first set of FMMs, wherein each respective probability function indicates how likely a fault associated with the respective FMM is to occur as a function of time; and initiating running of the $N_{next}$ FMMs at the edge site during the $i^{th}$ time period.

According to some embodiments there is provided a method, in a deployment manager, DM, for controlling one or more deployment agents, DAs, wherein each DA is configured to provide N Fault Management Models, FMMs, where N is an integer value, to run at an edge site in a cloud system during a first time period. The method comprises receiving a first request to create a first DA at a first edge site; obtaining a first template DA, wherein the first template DA comprises a best performing previously terminated DA; and transmitting, to the first edge site, a creation request to initialize the first DA, wherein the creation request indicates that the first DA should be initialized using a set of template parameters used by the first template DA.

According to some embodiments there is provided a Fault Management System, FMS, for selecting $N_{next}$ Fault Management Models, FMMs, where $N_{next}$ is an integer value, to run at an edge site in a cloud system during an $i^{th}$ time period. The FMS comprises processing circuitry configured to cause the FMS to: in a deployment agent, DA: select the $N_{next}$ FMMs from a first set of FMMs based at least in part on respective probability functions associated with each of the first set of FMMs, wherein each respective probability function indicates how likely a fault associated with the respective FMM is to occur as a function of time; and initiate running of the $N_{next}$ FMMs at the edge site during the $i^{th}$ time period.

According to some embodiments there is provided a deployment manager, DM, for controlling one or more deployment agents, DAs, wherein each DA is configured to provide N Fault Management Models, FMMs, where N is an integer value, to run at an edge site in a cloud system during a first time period. The DM comprises processing circuitry configured to cause the DM to: receive a first request to create a first DA at a first edge site; obtain a first template DA, wherein the first template DA comprises a best performing previously terminated DA; and transmit, to the first edge site, a creation request to initialize the first DA, wherein the creation request indicates that the first DA should be initialized using a set of template parameters used by the first template DA.

BRIEF DESCRIPTION OF THE DRAWINGS

For a better understanding of the embodiments of the present disclosure, and to show how it may be put into effect, reference will now be made, by way of example only, to the accompanying drawings, in which:

FIG. 2 illustrates a method performed by a cloud system according to some embodiments;

FIG. 4 illustrates a method for selecting $N_{next}$ Fault Management Models, FMMs, where $N_{next}$ is an integer value, to run at an edge site in a cloud system during an $i^{th}$ time period;

FIG. 9 illustrates a method, in a deployment manager, DM, for controlling one or more deployment agents, DAs, wherein each DA is configured to provide N Fault Management Models, FMMs, where N is an integer value, to run at an edge site in a cloud system during a time period;

DESCRIPTION

Figure 1:
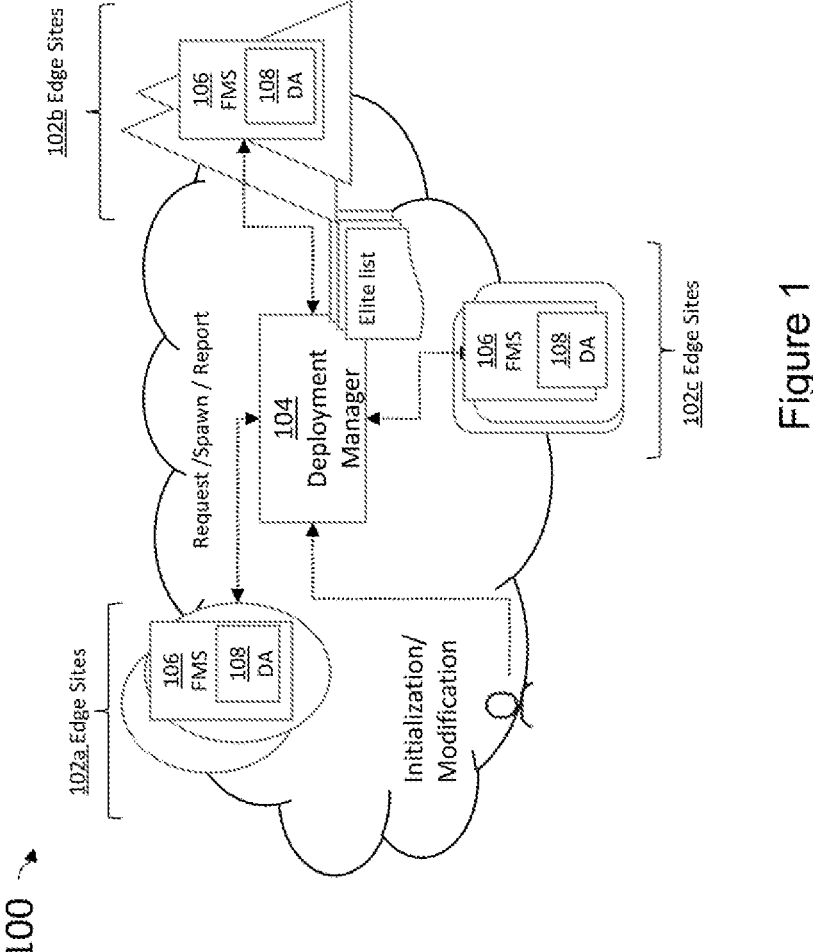
FIG. 1 illustrates a cloud system according to some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAS, etc.) and/or using software programs and data in conjunction with one or more digital microprocessors or general-purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

As described above, there is currently an optimisation problem in relation to deploying fault management models (FMMs), for example in an edge cloud system.

Embodiments described herein provide methods and apparatuses for automatically and adaptively deploying Fault Management Models (FMMs), in particular Machine Learning (ML) FMMs, in edge sites in a cloud system. Some embodiments described herein take the probability of a fault occurring at an edge site into consideration when addressing the goal of achieving a balance between the overall fault handling rate of the FMMs and the resource utilization by the FMMs at the edge site.

In embodiments described herein, a Deployment Agent (DA) is responsible for model deployment at an edge site. The DA may determine the type and the number of FMMs to run at the edge site during specific time periods. These decisions may be based on an evolutionary method inspired by antlion behaviours. A Deployment Manager (DM) is responsible for spawning Deployment Agents at edge sites in the cloud system. The DM may also control the overall resource utilization and fault handling rates of the cloud system.

Embodiments described herein may consider the available resources at an edge site, the fault handling rate of FMMs, the total resources used by (or to be used by) the FMMs. In addition to these considerations, due to the dynamicity of the edge cloud system, embodiments described herein are adaptive to changes in the environment. By fulfilling these requirements, a balance between the Fault Management System (FMS) overhead and the edge cloud system reliability may be achieved by the embodiments described herein.

FIG. 1 illustrates a cloud system 100 according to some embodiments.

The cloud system comprises a plurality of edge sites 102 and a Deployment Manager 104. In this example, the edge sites 102 fall into different categories (e.g., category 102a, 102b or 102c). The edge sites belonging to the same category may have access to a similar amount of resources and/or similar sorts of hardware and cloud infrastructure. It will however be appreciated that in some examples, the edge sites will not be categorised as such, or there will only be edge sites of one category present. There may also be any number of different categories of edge site in the cloud system 100.

Each edge site 102 comprises a fault management system (FMS) 106. The FMS is capable of requesting deployment of a deployment agent (DA) 108 at the edge site 102. The DA 108, as previously mentioned, may then deploy and control the running of the FMMs at the edge site. The functionality of an FMS and the deployment of a DA by the FMS is described in more detail with reference to FIGS. 3 to 7. In some examples, the determination of how many and which FMMs to run at an edge site may be based on one or more of: probability functions associated with faults that may occur at the edge site, a fault handling level of the DA, an environmental policy and any resource constraints of the edge site.

The FMS 106 may be responsible for local edge fault management. For example, the FMS 106 may request for a DA from the DM 104 during initiation of the edge site 102. The FMS 106 may also comprise a monitoring system (as will be described later with reference to FIG. 3) that monitors a resource usage measure and a fault handling rate of each of the FMMs running at the edge site 102.

The DM 104 may coordinate the deployment of the FMMs across all of the edge sites 102. In other words, the DM 104 may control the global resource utilization and the performance of the FMMs. In particular, the DM may maintain a list of template DAs (for example one template DA for each edge site category), and the relevant template DA may then be used as the basis for initiating deployment of a new Deployment Agent (DA) 108 for a specific category of edge site.

A DM may initiate deployment of a new DA 108 when a Fault Management System (FMS) requests it, or when the DM receives a status report of a terminating DA (as will be described in more detail later). The functionality of the DM will be described in more detail with reference to FIGS. 8 to 11.

In some examples, the cloud system may perform the method as illustrated in FIG. 2.

In step 201, an operator of the cloud system 100 initializes or modifies fault management system requirements. For example, the operator may set a maximum value for the resource utilization by FMMs at any edge site (e.g., 5%), and/or may set a minimum fault handling rate at any edge site, (e.g., 90%). These values may be used in later decisions by the DM and DA.

In step 202, an FMS requests a new DA. In some examples, the FMS may include an indication of the category of the edge site when requesting the new DA.

In step 203, the DM finds the relevant template DA (e.g., for the indicated category of edge site), and initialises deployment of the new DA. The new DA shall be initialised based on parameters in the template DA.

In step 204, at each time period (the duration of the time period may be set by the operator in step 201), the DA determines a number ($N_{next}$) of FMMs to deploy at the edge site. This decision may be based a number of different factors as will be described in more detail with reference to FIGS. 3 to 7 below.

In step 205, the DA selects and runs $N_{next}$ FMMs at the edge site. The $N_{next}$ FMMs may be selected as the $N_{next}$ FMMs that are associated with faults that have a higher probability of occurring during the next time period.

The deployment decisions at each edge site are therefore autonomous. In some examples, certain policies may be enforced at the edge site so that, for example, global key performance indicators (KPIs) such as a policy fault handling rate and a policy resource usage measure, are fulfilled.

In step 206, the DA reports its status report to the DM when its lifespan is over (i.e., when the DA terminates as will be described in more detail later).

In step 207, the DM determines whether to update the template DA (or the template DA associated with the category of the edge site) based on the status report received in step 206.

It should be noted that this method is not attempting to improve the performance of the individual ML models or how a model can be retrained to adapt to an edge site use e.g., transfer learning. Instead, it assumes that the existing FM ML models are well-trained, and they can perform well, e.g., can detect, predict or prevent a specific fault once the fault occurs or is about to occur.

The method may be configured not to select FMMs among redundant FMMs. It may, for example, be assumed that one FMM (or one set of FMMs in the case of ensemble learning) serves a specific purpose. In addition, the method may not handle the execution sequence of the FMMs, assuming that at a specific time, all FMMs may be available to run in parallel.

Figure 3:
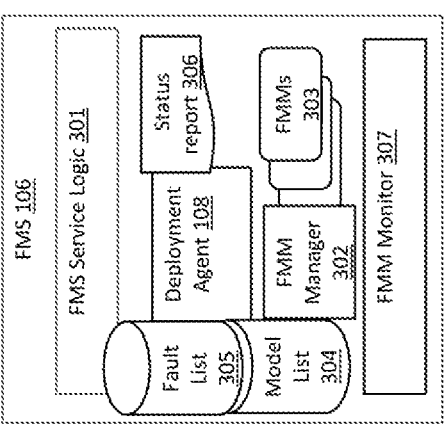
FIG. 3 illustrates an example of a Fault Management System in more detail.

FIG. 3 illustrates an example of an FMS 106 in more detail. In particular FIG. 3 illustrates possible functional components of an FMS 106 according to some embodiments.

In this example, the FMS 106 comprises service logic 301. The service logic 301 may be responsible for requesting creation of a DA from the DM 104. The service logic 301 may also define policies and procedures for local fault management.

The DA 108, as described above, may be responsible for making deployment decisions including how many and which FMMs to execute during any particular time period. The DA 108 may also call the FMM Manager 302 to prepare the FMM execution environment and run the selected FMMs 303. The FMMs may be selected at each time period from a model list 304. The model list may be stored at the edge site 102 or may be otherwise accessible by the DA 108. Each entry in the model list 304 may indicate which one or more faults each respective FMM is capable of handling.

The DA 108 may also have access to a fault list 305. The fault list 305 may indicate the different faults that may occur at the edge site. In particular, each entry in the fault list 305 may comprise a respective probability function for the fault, which indicates how likely the fault is to occur as a function of time. The DA 108 may then utilise the fault list 305 when determining how many and which FMMs to execute during a time period.

The DA 108 may also maintain a status report 306 that memorizes the deployment decisions for the timeline, together with the FMM statistics at each time period. The FMM statistics may be provisioned by the FMM monitor 307, which monitors if faults are appropriately handled (e.g., detected, predicted or prevented) by the FMMs and calculates the fault handling rate of the FMMs during a time period. The FMM monitor may also monitor the FMMs' resource usage at the edge site 102 during each time period.

The FMM statistics may also be made available for other network components, such as the DM, to subscribe to. It will be appreciated that the latency associated with the FMM monitor 307 determining how many faults occurred during a time period may be greater than the latency associated with any particular FMM for predicting, detecting or preventing faults occurring during the time period.

It will be appreciated that DM, FMS and DA as described herein may be implemented as software components. These components may therefore be realized e.g., as containers and deployed in cloud systems. The DM may be logically centralized; however, the functionalities of the DM may be deployed as a distributed system. The DAs may also be distributed and logically, there may be one DA per edge site. Physically a DA may be deployed in any edge site which has enough resources to execute it if the host edge site does not have enough resources.

As will be described in more detail later, the DA may be configured to autonomously determine the type and the number of FMMs to run at a specific time period. At each time period, a DA may increase the number of FMMs to deploy if the previously deployed models have not handled enough faults, keep the same number of FMMs if a fault handling level remains unchanged, and may decrease the number of FMMs otherwise.

The DA may also be configured to modify the number of FMMs to deploy if there is an environmental policy to enforce, or there is a policy enforcement received from the DM.

The DA may also terminate if the maximum lifespan is reached or if it has not handled enough faults.

FIG. 4 illustrates a method for selecting $N_{next}$ Fault Management Models, FMMs, where $N_{next}$ is an integer value, to run at an edge site in a cloud system during an $i^{th}$ time period.

The method of FIG. 4 may be implemented by the edge site. For example, the method of FIG. 4 may be implemented by the FMS 106 as illustrated in FIG. 3. It will be appreciated that the method of FIG. 4 may be implemented by each FMS at each edge site in the cloud system.

Steps 401 and 402 of the method may be performed by the deployment agent, DA, 108. As described with reference to step 203 of FIG. 2, the DA 108 may be requested to be initialized by the FMS 106 based on a template DA. The template DA may be transmitted to the edge site by the DM to initialize the DA.

In step 401, the method comprises selecting the $N_{next}$ FMMs from a first set of FMMs based at least in part on respective probability functions associated with each of the first set of FMMs, wherein each respective probability function indicates how likely a fault associated with the respective FMM is to occur as a function of time.

For example, the first set of FMMs may comprise the FMMs in the model list 304. Each entry in the model list may comprise one or more of the following pieces of information:

The category of the edge site, (e.g., Edge_Type_id)

An ID of the FMM (e.g., Model_id)

An identification of a fault associated with the model (e.g., Fault_id) (in other words, the type of fault that the model is designed to handle)

The input data format for the model; and

The resources required to run the model

Each entry in the fault list 305 may then comprise one or more of the following pieces of information:

The category of the edge site, (e.g., Edge_Type_id)

An identification of the fault (e.g., Fault_id)

A probability distribution function associated with the fault; and

A description of the fault.

It may therefore be appreciated that the probability function associated with a particular FMM may be derived from the entry in the fault list that is associated with the identification of the fault in the FMM entry in the model list.

A probability function associated with a particular fault may, for example, be provisioned by a hardware provider or be based on some statistics studies. In some examples, a probability function will take into account some seasonal changes (e.g., probability changes as a function of time, such as a greater probability of a fault occurring during the day than at night) associated with, for example, implementing a FMM in a particular scenario. For example, a probability function for a fault may take into account changes in likelihood due to known times of high traffic in a particular type of network application. However, in some examples, such seasonal changes are not taken into account in the probability function. In these examples, an environmental policy may be utilised in order to account for these seasonal changes. Further description of the environmental policy and how it may be implemented will be provided later.

In some examples, a probability function (Pf(t,o)) for a fault may be expressed as: $Pf(t,o)=f(t,o^{0\sim t-1})$, where o is the occurrence of the fault, t is time, and $o^{0\sim t-1}$ is a previous fault occurrence factor.

In some examples, the method comprises selecting the $N_{next}$ FMMs as the Next FMMs in the first set of FMMs associated with probability functions that provide the $N_{next}$ highest respective probabilities during the $i^{th}$ time period. In other words, the DA may select the FMMs that are associated with the type of faults that are most likely to occur during the $i^{th}$ time period.

In step 402, the method comprises initiating running of the $N_{next}$ FMMs at the edge site during the $i^{th}$ time period. For example, the DA 108 may initiate the running of the FMMs 303 via the FMM Manager 302.

In some examples, the step of selecting the $N_{next}$ FMMs may evolve over time based on a mechanism inspired by the following antlion behaviours (described with reference to FIG. 5):

An antlion traps an ant by digging a pit and waiting for ants that are passing by An antlion adjusts its pit size from time to time (e.g., an antlion may dig a larger pit when it is more hungry, and/or an antlion may dig a larger pit during a full moon (e.g., during a particular season))

An antlion with a larger pit has a higher probability of trapping ants

An elite is an antlion that survives longer

The next generation of antlions inherit the gene of the elite

An existing antlion optimizer (ALO) algorithm simulates the walking behavior/space of an ant towards an antlion, which is suitable for continuous parameter searching problem. However, in the problem of selecting the $N_{next}$ FMMs, a fault occurring in an edge site is more of a statistics and probability problem. It is therefore difficult to map to the ALO algorithm.

The existing ALO algorithm works for one-time optimization such as minimizing the make-span of task scheduling, in which ALO is run each time when there is a new task scheduling request. There is no relationship between ALO optimizations, which makes the optimization non-continuous. However, the FMS optimization may be a continuous task.

In embodiments described herein, the characteristics for the problem of fault management model deployment may therefore be modelled differently to any existing ALO algorithm based on the described antlion behaviours as follows:

An ant may be equated to a fault to be handled (e.g., predicted, detected, or prevented) by the FMMs. During a time period (T1, where T1 has a fixed duration, e.g., 4 hours, 6 hours), there is a probability of the fault occurring (Pf) and the probability may be calculated using a probability function (for example as described above). Each probability function may comprise one equation or a set of equations.

An antlion may be equated to a deployment agent (DA) that determines, during a time period (T1), the number (N) and the types of FMM to run at the edge site. The DA may then run the N FMMs during T1 and wait for faults to occur.

A pit may be equated to an environment that runs the defined number and type of FMMs.

The size (N) of a pit may be equated to the number N of FMMs to be deployed during a time period. The number N of FMMs may be adjusted based on the available resources at the edge site.

The type of a pit may be equated to types of FMMs to be deployed during a time period. The types of FMMs selected may be adjusted based on the probability of a particular type of fault occurring during a current time period.

A season may be equated to a time period for an environmental policy. An environmental policy may indicate one or more policy functions, $Pof^x$, to be applied during one or more time periods $T2^x$, (where the duration of $T2^x$ may be $= \alpha*T1$, where $\alpha > 0$ and is an integer). For example, during $T2^1$ a first policy function, (e.g., $Pof^1$) may be applied such that the value of N is changed, for example, enlarged by 2, or reduced by 1. During a time period $T2^2$ a different policy function (e.g., $Pof^2$) may be applied. An environmental policy may be optional for the edge sites at which the fault occurring probability does not follow such predictable seasonal changes, or for which the seasonal changes are already taken into account within the probability function. For example, more faults are likely to occur in the busy hours of a day than in idle hours of the day. The busy hours and the idle hours of a day may therefore be represented by two different environmental policies which occur regularly.

A maximum pit size may be equated to, at a specific edge site type (in some examples, when a particular environmental policy applies), the maximum number ($N_{max}$) of FMMs allowed to run at the edge site. This value may be based on resource constraints for FMMs.

A minimum pit size may be equated to, at a specific edge site type (in some examples, when a particular environmental policy applied) the minimum number ($N_{min}$) of FMMs allowed to run at the edge site. This value may affect the fault handling rate.

A trapped ant may be equated to a fault that is successfully handled by the running FMMs running at an edge site. The successful handling of a fault may be different for different types of FMM. For example, an FMM may be configured to attempt to detect, predict and/or prevent faults.

A trapping rate of trapping ants may be equated to a fault handling rate (Tr) at a DA. The fault handling rate may be calculated as the total number of faults successfully handled by the FMMs running at the DA divided by the total number of faults that occurred (or would have occurred if they had not been prevented). If there is no fault, the fault handling rate may be set to 1. The DM may be configured to calculate the average fault handling rate for all of the DAs (or all of the DAs for a particular edge site category).

The Hungry level of an antlion (which affects how large a pit it digs), may be equated to a fault handling level (FHL) at a DA. At each time period (T1), if a DA has not successfully handled any faults, its fault handling level may be increased by an integer value (e.g., 1). A DA's fault handling level may remain the same for a subsequent time period if a fault is successfully handled during a current time period. The fault handling level may then be decreased by an integer value (e.g., 1) for each additional fault successfully handled during the current time period. The fault handling level may be an integer value, and it may be a negative value. The initial value of the fault handling level may be 0 when a DA is deployed.

A lifespan of an antlion may be equated to a lifespan of a DA, T3. In some examples, $T3=\beta*T1$, $\beta > 0$, $\beta$ is a positive integer, and T3>the duration of a policy $T2^x$.

A maximum lifespan of an antlion may be equated to a maximum lifespan of a DA, $T3_{max}$. $T3_{max}$ may be a parameter provided in a template DA.

The death of an antlion may be equated to when a DA will stop running (terminate), for example if the maximum lifespan is reached or if the fault handling level reaches a threshold fault handling level, $FHL_{max}$. The value of $FHL_{max}$ may be fixed for any DA.

An Elite may be equated to a DA that remains active for the longest (or is best performing), for example, handles more faults during its lifespan. The DA that is best performing may then be used as a template DA for initialising other DAs.

The type of antlion may be equated to a category of DA. There may be one template DA per category of DA.

The pit size may be correlated with the resource usage measure (Ru) at an edge site. The resource usage measure may comprise a percentage of the resources used by all running FMMs at an edge site.

It will be appreciated that steps 401 and 402 may therefore be performed for each time period (e.g., of length T1) in a DA's lifespan. The steps 401 and 402 may determine both how many (e.g., $N_{next}$) and which FMMs to run in the time period.

The selection of the $N_{next}$ FMMs may be based on one or more of the following parameters: $N_{max}$, $N_{min}$, an environmental policy, the fault handling level ($FHL^i$), and the probability of the associated fault (Pf) occurring during the $i^{th}$ time period.

In some examples, step 401 of FIG. 4 may be performed by obeying the following pseudo code:

```
Current time period = i–1
Current number of FMMs = N_current
IF N_current == 0: N_current =random(N_min, N_max)
ENDIF
IF in template DA's status report, N^i != null:
    N_next = N^i in template DA's status report
ELSE:
    N_next = N_current
    IF (T2^x)^i != (T2^x)^{i−1}  #environmental policy changed
        Apply the policy function Pof^x(N) for (T2^x)^i, e.g., if policy function Pof^x(N) =
N–1, then N_next = N_next −1
    ENDIF
ENDIF
IF FHL^i != FHL^{i−1}: Fault handling level has changed
```

-continued $N_{next} = N_{next} + (FHL^i - FHL^{i-1})$
ENDIF
IF $N_{next} > N_{max}$: $N_{next} = N_{max}$
ELSE IF $N_{next} < N_{min}$: $N_{next} = N_{min}$
ENDIF
Select $N_{next}$ number of FMMs ([FMM$_1$, FMM$_{Nnext}$]) from model list, where the FMMs
selected handle faults with top probabilities Pf$^i$ to occur
Return $N_{next}$, [FMM$_1$, FMM$_{Nnext}$]

In other words, step 401 of FIG. 4 for the $i^{th}$ time period (e.g., the first time period) following initialization of the DA, may comprise determining a current number of FMMs ($N_{current}$), which is a number of FMMs run in a (i–1)th time period (e.g. a second time period) immediately preceding the $i^{th}$ time period.

The method may then comprise, unless one or more other conditions are met (as will be described below), setting the value of $N_{next}$ (e.g., the number of FMMs to be run in the $i^{th}$ time period) as equal to $N_{current}$. In other words, $N_{next}=N_{current}$ However, responsive to $N_{current}$ being 0 (for example, responsive to the $i^{th}$ time period being the first time period after the DA is initialized), the method may comprise setting the value of $N_{next}$ as a random value between a maximum N value ($N_{max}$) and a minimum N value ($N_{min}$). In other words, If $N_{current}=0$, set $N_{next}=$random ($N_{min}$, $N_{max}$).

Furthermore, responsive to a status report of a template DA used to initialize the DA comprising an entry associated with an $i^{th}$ time interval during which the template DA was running, the method may comprise setting the value of $N_{next}$ as equal to a number of FMMs run by the template DA during the $i^{th}$ time interval. In other words, if in the template DAs status report N$^i$!=null, set $N_{next}=N^i$ in DA status report.

In some embodiments, step 401 may then further comprise adjusting the value of $N_{next}$ based on how many faults were handled by one or more FMMs running at the edge site during the i–1$^{th}$ time period. As previously mentioned the fault handling level FHL$^i$ may be set for the $i^{th}$ time period, wherein the fault handling level FHL$^i$ is based on the number of faults handled by one or more FMMs running at the edge site during the (i–1)$^{th}$ time period and a previous fault handling level FHL$^{i-1}$ set during the (i–1)$^{th}$ time period. The fault handling level FHL$^i$ may comprise an integer value.

For example, responsive to handling no faults during the (i–1)$^{th}$ time period, the fault handling level FHL$^i$ may be determined by increasing the previous fault handling level FHL$^{i-1}$ by a first predetermined amount (for example, by 1).

For example, responsive to handling X faults during the (i–1)$^{th}$ time period, where X is an integer value, the fault handling level FHL$^i$ may be determined by decreasing the previous fault handling level FHL$^{i-1}$ by (X-a second predetermined amount (e.g. 1)).

In order to adjust the value of $N_{next}$ based on the fault handling level FHL$^i$, step 401 may comprise adjusting the value of $N_{next}$ by: subtracting the fault handling level FHL$^i$ from the previous fault handling level FHL$^{i-1}$ to generate an adjustment value, and adjusting the value of $N_{next}$ by adding the adjustment value to $N_{next}$.

In other words, $N_{next}=N_{next}+(FHL^i-FHL^{i-1})$.

In some examples, the method may further comprise constraining the value of $N_{next}$ between a maximum N value and a minimum N value. In other words, if $N_{next}>N_{max}$: $N_{next}=N_{max}$, and if $N_{next}<N_{min}$: $N_{next}=N_{min}$ In some examples, the method further comprises, responsive to an environmental policy time period T2$^x$ being different during the $i^{th}$ time period and during the (i–1)$^{th}$ time period, adjusting the value of $N_{next}$ based on a policy function associated with the environmental policy of the $i^{th}$ time period. In other words, if (T2$^x$)$^i$!=(T2$^x$)$^{i-1}$ then the policy function to be applied according to the environmental policy has changed, for example the policy function might be Pof$^1$ (N) in T2$^1$ during the $i^{th}$ period and Pof$^2$ (N) in T2$^2$ during the (i+1)$^{th}$ period. The method may therefore adjust the value of $N_{next}$ based on a policy function associated with the environmental policy during (T2$^x$)$^i$. For example, the function associated with the environmental policy for (T2$^x$)$^i$ may be pof$^x$(N)=N–1. Therefore, $N_{next}$ may be adjusted as: $N_{next}=N_{next}-1$.

It will be appreciated, that in order to force iterations of template DAs, and therefore continue to improve the template DA, it may be beneficial for a DA running at an edge site to terminate, and be continually replaced. When a DA reaches the end of its life (e.g., a maximum fault handling level (FHL$_{max}$) is reached or a maximum lifespan (T3$_{max}$) is reached), the DA may transmit a status report to the DM. The DM may then explicitly terminate the DA, which results in all the FMMs running at the edge site being terminated and the DA being deleted. Triggered by the receipt of the status report, the DM may initiate creation of a new DA at the edge site.

The status report of a DA may comprise, for each $i^{th}$ time period that the DA is running, information relating to the running of the FMMs during the time period.

For example, to generate the status report, the FMS may be configured to: at the end of the $i^{th}$ time period: obtain a fault handling rate, Tri, associated with the $i^{th}$ time period, T1$^i$ wherein the fault handling rate is indicative of how many of a number of faults occurring during the $i^{th}$ time period were handled by running the $N_{next}$ FMMs during the $i^{th}$ time period; obtain a resource usage measure, Ru$^i$, associated with the $i^{th}$ time period, T11, wherein the resource usage measure is indicative of how much of resources available at the edge site were utilized by the $N_{next}$ FMMs during the $i^{th}$ time period. In some examples, the resource usage measure may be expressed as a percentage of the total resources available at the edge site.

The FMS may then store an entry for the $i^{th}$ time period in the status report 306 for the DA 108. The entry in the status report 306 may comprise one or more of: an indication of the $i^{th}$ time period T1$^i$, the value of $N_{next}$ during the $i^{th}$ time period, the fault handling rate, Tri associated with the $i^{th}$ time period, and the resource usage, Ru$^i$, associated with the $i^{th}$ time period. In some examples, the entry further comprises an indication of an environmental policy time period (e.g., T2$^x$) associated with the $i^{th}$ time period.

Table 1 below illustrates an example of a status report 306 for a DA 108.

TABLE 1

| An example status report for a DA. | | | | |
|---|---|---|---|---|
| $T1^0$ | $T2^0$ | $N^0 = 6$ | $Tr^0 = 1$ | $Ru^0 = 2\%$ |
| $T1^1$ | $T2^1$ | $N^1 = 7$ | $Tr^1 = 1$ | $Ru^1 = 3\%$ |
| $T1^2$ | $T2^1$ | $N^2 = 7$ | $Tr^2 = 0.5$ | $Ru^2 = 2\%$ |
| — | — | — | — | — |
| $T1^n$ | $T2^0$ | $N^n = 6$ | $Tr^n = 1$ | $Ru^n = 2\%$ |

Figure 5:
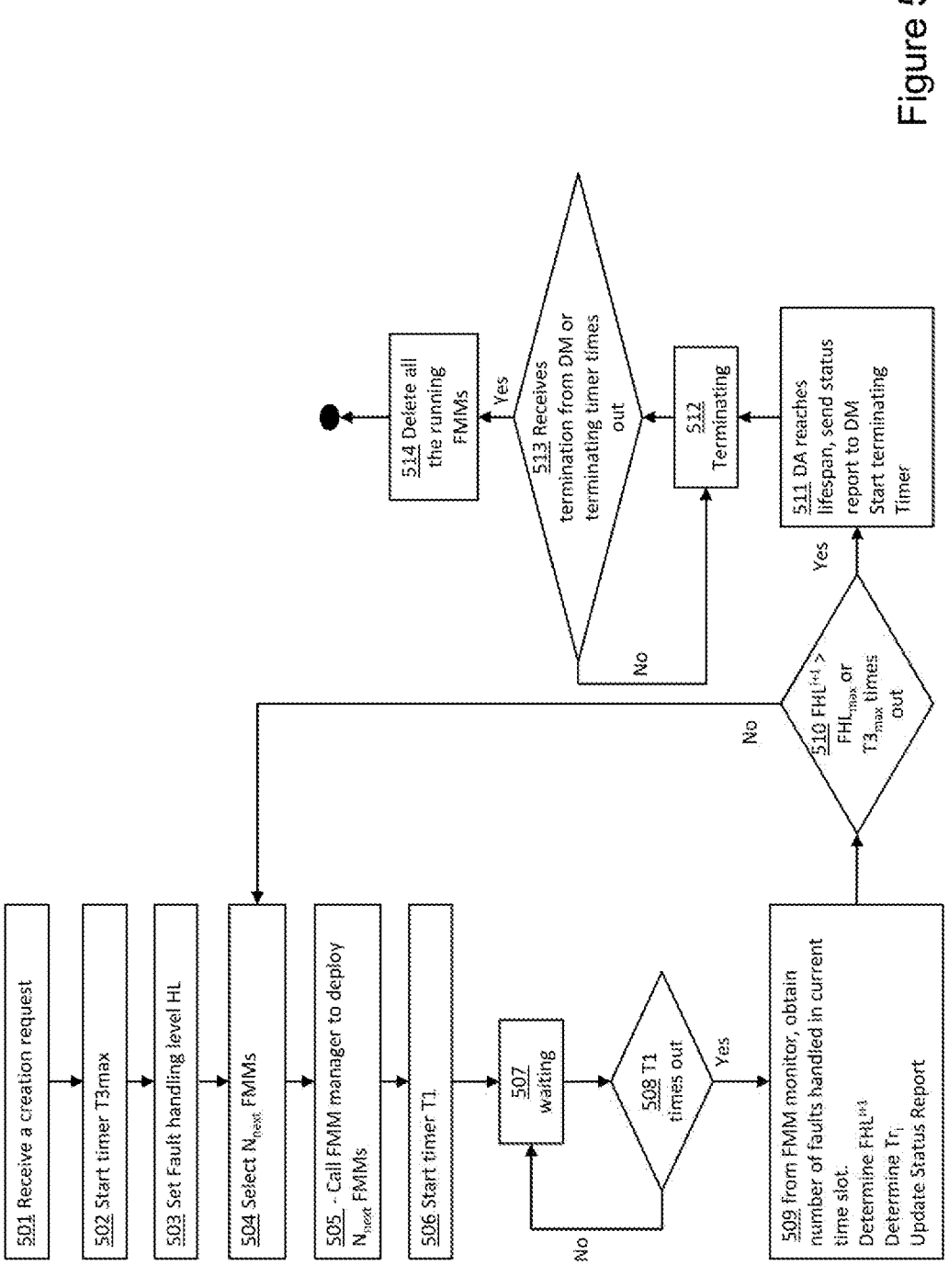
FIG. 5 illustrates a method of controlling a lifecycle of a DA.

FIG. 5 illustrates a method of controlling a lifecycle of a DA. The method of FIG. 5 implements the method of FIG. 4. The method of FIG. 5 may be performed by the edge site (e.g., the edge site performing the method of FIG. 4). In particular, the method of FIG. 5 may be performed by an FMS in the edge site.

In step 501, the method comprises receiving a creation request from a deployment manager to initialize the DA. The creation request comprises one or more of: a status report of a template DA, a set of template parameters, an indication of the first set of FMMs, an indication of a set of possible faults that can occur at the first edge site and their associated respective probability functions; an identification of the edge site; and a DA identification.

The set of template parameters may comprise one or more of: a duration for each $i^{th}$ time period (T1), a maximum lifespan time period for which the DA may run ($T3_{max}$); a maximum fault handling level ($FHL_{max}$); a maximum N value ($N_{max}$); a minimum N value ($N_{min}$), and an environmental policy.

In step 502, the method comprises starting a timer responsive to receiving the creation request. The timer may be configured to stop once the timer reaches $T3_{max}$.

In step 503, the method comprises setting the fault handling level FHL. The fault handling level may be initialized at 0.

In step 504, the method comprises determining the $N_{next}$ FMMs to deploy, for example as described above.

In step 505, the method comprises initializing deployment of the $N_{next}$ FMMs. For example, the FMS may call the FMM manager to deploy the $N_{next}$ FMMs.

In step 506, responsive to initializing deployment of the $N_{next}$ FMMs, a timer of duration T1 may be started.

In step 507, the method comprises waiting whilst the $N_{next}$ FMMs are run. During this period, a policy update provided by the DM may also be implemented (as will be described in more detail with reference to FIGS. 6 and 7).

In step 508, the timer T1 expires.

In step 509, the method may comprise obtaining a number of faults handled by the N-next FMMs during the step 507. The method may also comprise updating the fault handling level for the next time period based on the number of faults handled, X. For example, the fault handling level for the $(i+1)^{th}$ may be updated as: $FHL^{i+1} = FHL^i + 1 - X$.

The method may also comprise determining the fault handling rate Tri for the time period, and the resource usage measure $Ru^i$ for the time period.

Step 509 may then further comprise updating the status report for the DA with the information for the $i^{th}$ time period. For example, as described above (e.g., with reference to table 1).

In step 510 the method comprises determining whether the fault handling level, $FHL^{i+1}$ is greater than a maximum fault handling level, and/or whether the timer set in step 502 has reached $T3_{max}$. If neither of these conditions have occurred, the method may return to step 504 in which the process repeats for the next time period.

If either of the conditions of step 510 have occurred, the method passes to step 511 in which the status report for the DA is transmitted to the DM. The status report may comprise information as illustrated above in table 1. In some examples, the status report for the DA may further comprise an identification of the DA, and the template parameters utilized to initialize the DA.

Step 511 may further comprise initiating the termination of the DA. For example, a terminating timer may be started. In steps 512 and 513, the FMS begins termination of the DA and waits for either an indication of termination to be received from the DM, or for the terminating timer to expire.

Once either an indication of termination is received from the DM or the terminating timer expires, the FMS deletes all running FMMs and terminates the DA in step 514.

As previously mentioned, an FMM deployment decision may be updated when there is a policy update received from the DM. Again, as noted with reference to FIG. 5, such a policy update may be implemented when the DA is waiting (as in step 507 of FIG. 5). Any policy update received whilst the DA is in any other state may be queued.

A policy update may be initialized by the DM (for example, by a Statistics Monitor as will be described in more detail later) and executed by each DA. In other words, when the DM detects a policy violation, e.g., the overall resource usage measured by the FMMs running at an edge sites of a particular category exceeds a 5% threshold for 3 hours, or the overall average fault handling rate for FMMs running at the edge sites of the particular category has decreased below a threshold of 80%, the DM may initiate a policy update.

Figures 6A, 6B:
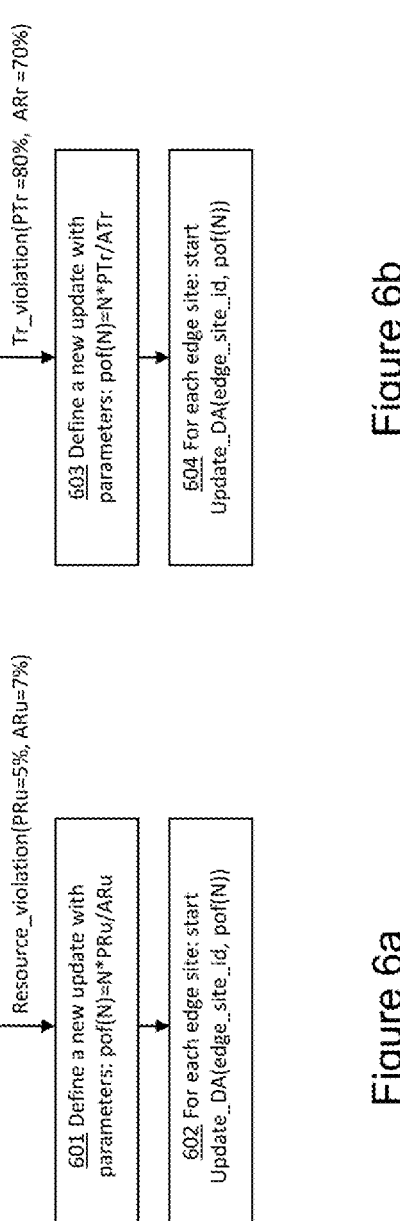
FIG. 6a illustrates an example of a resource usage policy violation.
FIG. 6b illustrates an example of a fault handling rate policy violation.

FIGS. 6a and 6b illustrate two examples of a policy update. In these examples, the function pof( ) is the policy function. It will be appreciated that other forms of policy function may be utilised.

Note that a policy update will affect all DAs (or all DAs running on edge sites of the same category) and it may therefore be considered an expensive process. An operator confirmation may, for example, be required before the operation of a policy update is performed.

It will be appreciated that the DM may have been configured to obtain, for each DA in one or more active DAs, a fault handling rate of the DA associated with running $N_{next}$ FMMs during the first time period. The DM may also be configured to obtain, for each DA in one or more active DAs, a resource usage measure of the DA associated with running $N_{next}$ FMMs during the first time period. These values may be transmitted to the DM by the respective DAs.

For example, the edge site may be configured to transmit the fault handling rate, wherein the fault handling rate indicates how many of one or more faults occurring during the $i^{th}$ time period are detected, predicted and/or prevented by the $N_{next}$ FMMs, to the DM. Similarly, the edge site may be configured to transmit the resource usage measure, wherein the resource usage measure is indicative of how much of resources available at the edge site were utilized by the $N_{next}$ FMMs during the $i^{th}$ time period to the DM.

FIG. 6a illustrates an example of a resource usage policy violation.

In this example, the DM may determine that an average resource usage measure of the DAs in the network (or the DAs running on edge sites of a particular category) is 7%. For example, the DM may determine an average of the resource usage measures received from all DAs in the network, or may determine an average of the resource usage measures received from all DAs of a particular category in the network.

The determined average resource usage measure may violate a resource usage policy that states that the average resource usage measure, ARu, should be kept below a policy resource usage, PRu, of 5%.

The DM may therefore in step 601 determine the policy function pof(N) to be used to update the value of $N_{next}$ at each DA. The policy function in this example, updates $N_{next}$ as follows pof($N_{next}$)=$N_{current}$*PRu/ARu. Where $N_{current}$ are the number of FMMs currently running during the state of waiting. The determined value of $N_{next}$ in this step may override the determination of $N_{next}$ as described with reference to step 504 of FIG. 5.

In step 602, the DM may then transmit an update request to each edge site running a DA (or running a DA of a particular category). The update request may comprise the policy function. This update request may effectively request that the receiving DA selects Y, where Y is an integer value, FMMs to terminate for a next time period. The value of Y may be determined by the receiving DA.

FIG. 6b illustrates an example of a fault handling rate policy violation.

In this example, the DM may determine that an average fault handling rate by the DAs in the network (or the DAs of a particular category) is 70%. For example, the DM may determine an average of the fault handling rates received from all DAs in the network, or may determine an average of the fault handling rates received from all DAs of a particular category in the network.

In this example, the determined average fault handling rate violates a fault handling rate policy that states that the average fault handling rate, ATr, should be greater than a policy fault handling rate, PTr, of 80%.

The DM may therefore in step 603 determine the policy function pof($N_{current}$) to be used to update the value of $N_{next}$ at each DA. The policy function in this example, determines $N_{next}$ as follows $N_{next}$=$N_{current}$*PTr/ATr. Where $N_{current}$ are the number of FMMs currently running during the state of waiting.

The determined value of $N_{next}$ in this step may override the determination of $N_{next}$ in step 504 of FIG. 5 according to the pseudocode as described above.

In step 604, the DM may then transmit an update request to each edge site running a DA (or running a DA of a particular category). The update request may comprise the policy function. This update request may effectively request that the receiving DA select M, where M is an integer value, more FMMs for a next time period. The value of M may be determined by the receiving DA.

Figure 7:
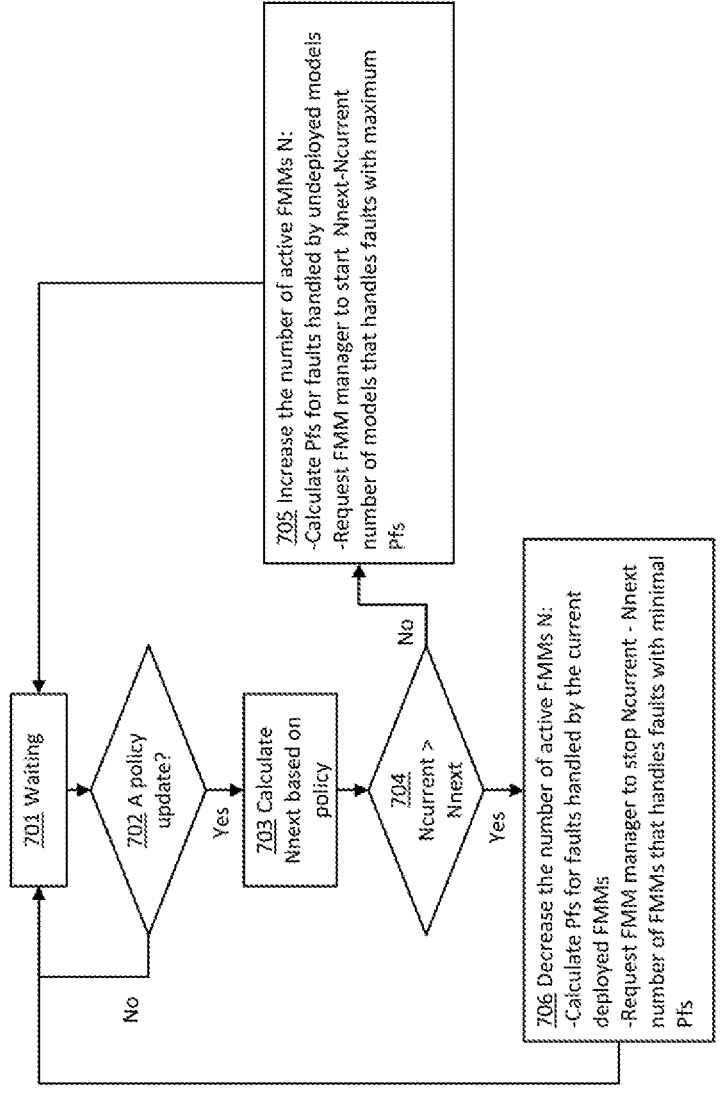
FIG. 7 illustrates how a policy update received from a DM may be implemented by a DA.

FIG. 7 illustrates how a policy update received from a DM may be implemented by a DA.

In step 701, the DA enters the step of waiting (as in step 507 of FIG. 5).

In step 702, the DA determines whether a policy update has been received from the DM. If a policy update has not been received from the DM, the DA continues in the waiting state. If a policy update has been received from the DM (for example comprising a policy function as described above with reference to FIGS. 6a and 6b), the method passes to step 703.

For example, the DA may, responsive to an average fault handling rate associated with one or more DAs during the $i^{th}$ time period being below a policy fault handling rate, receive a first update request from the DM to select M more FMMs. The one or more DAs may comprise all DAs or all DAs of a particular category (for example, as described above).

In other words, the policy function may indicate that $N_{next}$ is to be larger than $N_{current}$. It will be appreciated that the value of M may be different for each DA (depending on the value of $N_{current}$ at each DA).

In some examples, the DA may, responsive to the average resource usage measure associated with one or more DAs during the $i^{th}$ time period being above a policy resource usage, transmit a second update request to each DA to request that each DA reduce the number of FMMs by Y for a next time period. The one or more DAs may comprise all DAs or all DAs of a particular category.

In other words, the policy function may indicate that $N_{next}$ is to be smaller than $N_{current}$. It will be appreciated that the value of Y may be different for each DA (depending on the value of $N_{current}$ at each DA).

In step 703, the DA determines $N_{next}$ based on the policy function. In particular, $N_{next}$ may be determined by converting the output of the policy function into an integer value. For example, the output of the policy function may be rounded to the closest integer value.

In step 704, the method comprises determining whether $N_{next}$ is greater than or equal to $N_{current}$.

If $N_{next}$ is larger than $N_{current}$, the method passes to step 705 in which the DA selects M more FMMs from the first set of FMMs based on the respective probability functions associated with each of the first set of FMMs. It will be appreciated that the value of M may be determined as $N_{next}$-$N_{current}$. The value of M may be converted into an integer value (e.g., rounded) if $N_{next}$ had not already been converted as described above.

The M selected FMMs may be selected as the FMMs remaining in the first set of FMMs that are associated with probability functions that have the highest likelihood of a fault occurring in the next time period.

The DA may then initiate running of the M FMMs during the next time period. For example, the DA may request that the FMM manager starts the M FMMs (as well as continuing to run the $N_{current}$ FMMs) during the next time period.

If $N_{next}$ is smaller than $N_{current}$, the method passes to step 706 in which the DA selects Y FMMs from the $N_{current}$ FMMs based on the respective probability functions associated with each of the $N_{current}$ FMMs. It will be appreciated that the value of Y may be determined as $N_{current}$-$N_{next}$. The value of Y may be converted into an integer value (e.g., rounded) if $N_{next}$ had not already been converted as described above.

It will be appreciated that the Y FMMs selected from the $N_{current}$ FMMs may be the Y FMMs with the lowest Y respective probabilities during a next time period.

The DA may then initiate termination of the Y FMMs for the next time period. For example, the DA may request that the FMM manager terminates the Y FMMs (whilst continuing to run the remainder of the $N_{next}$ FMMs) during the next time period.

Figure 8:
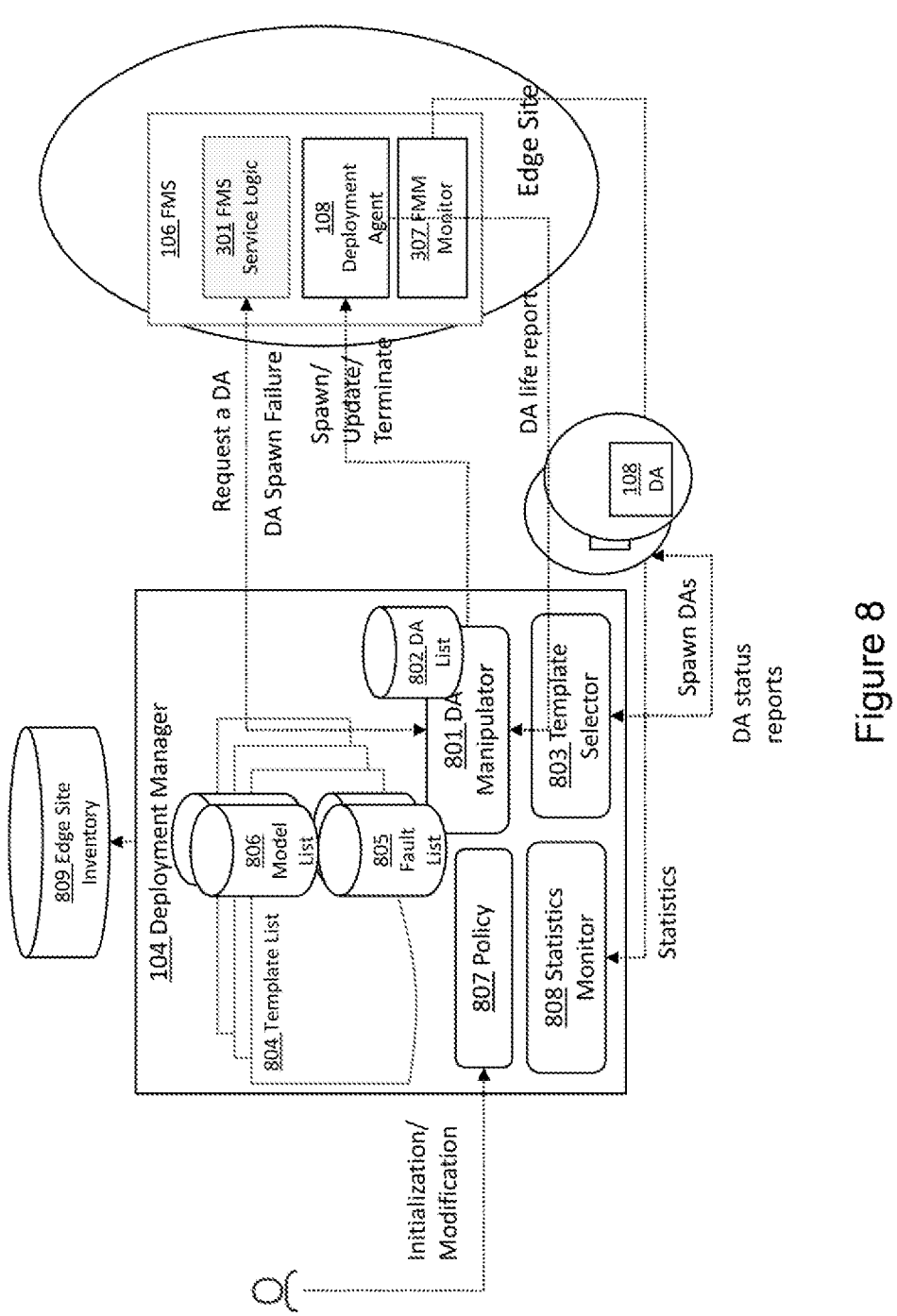
FIG. 8 illustrates an example block diagram of a DM according to some embodiments.

FIG. 8 illustrates an example block diagram of a DM 104 according to some embodiments.

The DM is responsible for selecting and maintaining template DAs, spawning DAs, terminating DAs, and ensuring that policy requirement (e.g., KPI requirements) of the network are met (e.g., by utilising policy updates as described above with reference to FIGS. 6 and 7).

In the example of FIG. 8, the DM 104 comprises a DA Manipulator (DAM) 801. The DAM 801 may be responsible for the lifecycle management of DAs. For example, the DAM 801 may receive DA requests and may in response initiate creation of, update and/or terminate DAs.

The DAM 801 may also maintain a DA list 802 of live (e.g., currently running) DAs. Each entry in the DA list may comprise one or more of: an identification of the DA, an identification of the edge site at which the DA is running, an identification of a template DA used to initialize the DA, a state of the DA (e.g., active, terminating or starting); and an DA instance identification (which may indicate how many different DAs have been run at the edge site).

In this example, the DM 104 further comprises a template selector 803. The template selector 803 may be responsible for initializing template selection and updates (for examples as will be described later with reference to FIG. 11).

Each template that is selected, for example for a particular category of edge site, may be stored in the template list 804. Each entry in the template list 804 may comprise one or more of: an identification of the template, the category of edge site to which the template DA applies, one or more template parameters (e.g., $T3_{max}$, $N_{max}$), and a status report of the template DA.

For each edge site category, the DM 104 comprises a Fault List 805 that stores the possible faults for the category of edge sites, and a Model List 806 that stores the FMMs for handling the respective faults. Each entry in the fault list 805 comprises one or more of: a fault identification, a description of the fault and a probability function associated with the fault. Each entry in the model list 806 comprises one or more of: a model identification, one or more faults that the FMM can handle, the required resources for the FMM, and an input data type for the FMM.

In other words, in some examples, for each category of edge site, the DM stores a template DA for use in deployment of DAs on the edge sites of that category, a Fault List 805 for storage of potential faults that may occur on edge sites of that category, and a Model List 806 for storage of the relevant FMMs for handling those faults.

The DM 104 may comprise a policy repository 807 that stores, for example, KPI requirements of the overall fault management of the cloud system. Two examples of such KPIs are 'overall FMMs resource utilization rate' and 'average fault handling rate'.

The KPIs may be configured or modified by an operator.

The DM 104 may also comprise a statistics monitor 808 which may be configured to periodically collect statistics from each edge site. For example, the statistics monitor 808 may be configured to calculate the current KPI values and compare them with the policy in the policy repository 807. If the requirements are not fulfilled for a period of time, it may enforce the policy by triggering the DA Manipulator (DAM) to update DA(s) (for example as described with reference to FIGS. 6 and 7).

It will therefore be appreciated that a DM may be responsible for managing the lifecycle of a DA and controlling the overall resource utilization and the fault handling rates. A DM may be configured to perform one or more of the following:

Maintain the list of DA templates, each for a category of edge site, together with the fault list and the model list for each edge site category;

Maintain the list of active DAs, each for an edge site;

Receive DA requests and create new DAs that inherit the behavior of a template DA;

Receive DA status report, terminate and recreate DAs, and update the template DAs if a DA is found to outperform the current template DA;

Select a template DA among multiple DAs based on the DAs' lifespans and performances;

Collect FMMs statistics from each edge site;

Receive FMS KPI Policy (such as fault handling rate and resource usage measure) configuration requests from the operator;

Enforce DA updates when there are policy violations detected based on the FMM statistics.

FIG. 9 illustrates a method, in a deployment manager, DM, for controlling one or more deployment agents, DAs, wherein each DA is configured to provide N Fault Management Models, FMMs, where N is an integer value, to run at an edge site in a cloud system during a time period.

In step 901, the method comprises receiving a first request to create a first DA at a first edge site. The first request may be generated by the first edge site, for example by the FMS service logic 301. For example, the first edge site may comprise a new edge site introduced into the cloud system. The first request may be received at the DAM 801.

In some examples, the first request comprises an indication that a previous DA at the first edge site has been terminated.

In step 902 the method comprises obtaining a first template DA, wherein the first template DA comprises a best performing previously terminated DA. The first template DA may be a template DA suitable for the category of the first edge site. The first template DA may therefore be obtained from the template list 804. It will therefore be appreciated that the method may comprise obtaining a plurality of first template DAs, one for each of a plurality of categories of edge sites.

In step 903, the method comprises transmitting, to the first edge site, a creation request to initialize the first DA, wherein the creation request indicates that the first DA should be initialized using a set of template parameters used by the first template DA.

In some examples, the creation request further comprises one or more of: a status report of the first template DA, an indication of a first set of FMMs and their associated respective probability functions, wherein each probability function is indicative of how likely the fault associated with the respective FMM to occur as a function of time, an indication of a set of possible faults that can occur at the first edge site; an identification of the edge site; and a DA identification.

In some examples, the set of template parameters comprises one or more of: a duration for the first time period, a maximum lifespan time period for which the first DA may run; a maximum fault handling level; a maximum N value; a minimum N value, and an environmental policy.

Figure 10:
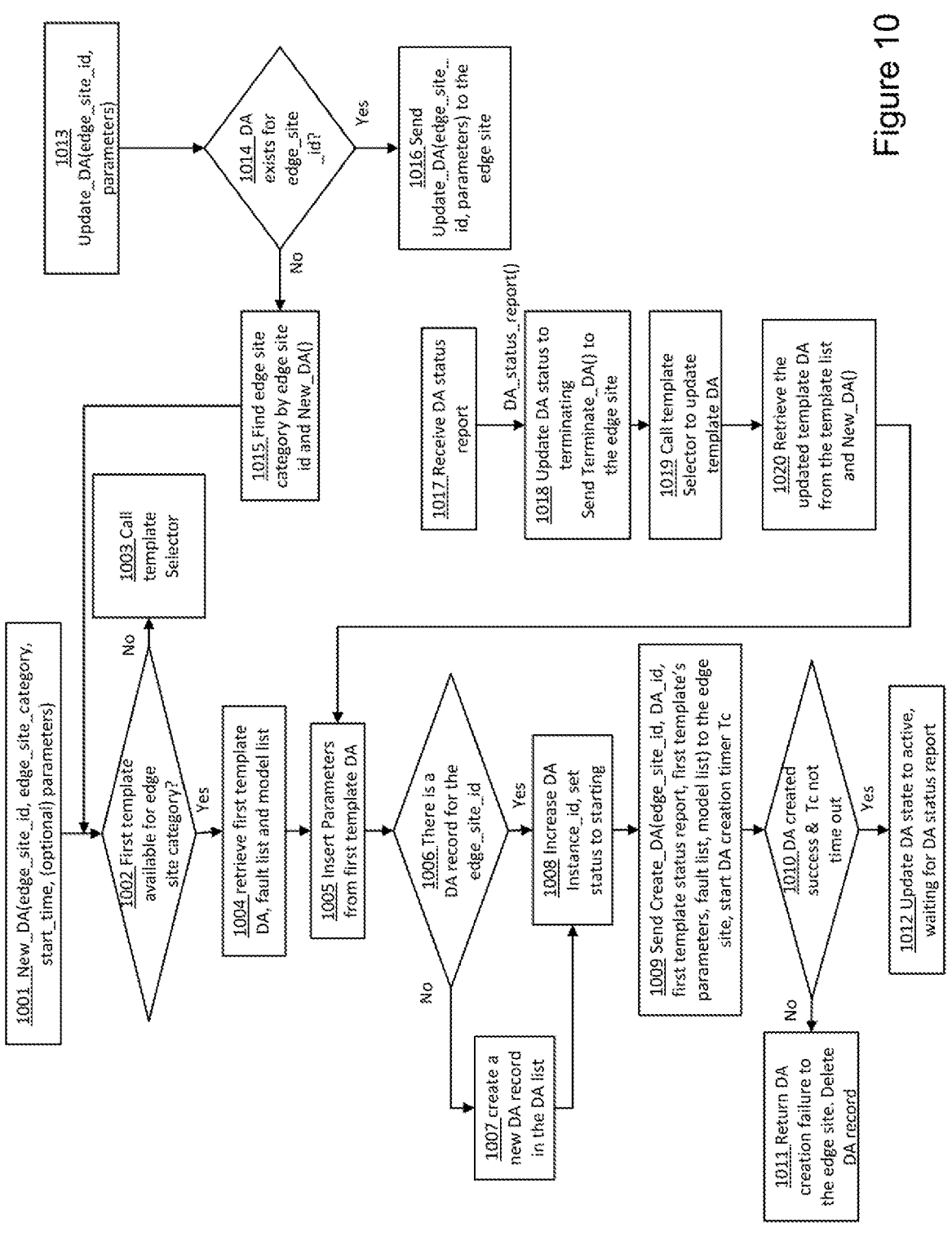
FIG. 10 illustrates an example implementation of the method of FIG. 9.

FIG. 10 illustrates an example implementation of the method of FIG. 9. The method of FIG. 10 may be performed by a DM 104. In particular, the method of FIG. 10 may be performed by a DAM 801 in a DM 104.

In the method of FIG. 10, the DAM 801 manages the creation, update and termination of DAs. The creation may be requested by an FMS in a newly deployed edge site, and after a DA termination. The process may result in a new DA created at an edge site which may then autonomously deploy fault management models (for example, as described above with reference to FIGS. 3 to 7 above). The new DA may inherit parameters from a template DA.

In step 1001, the method comprises receiving a first request to create a first DA at a first edge site. The first request may comprise one or more of: an identification of the first edge site, a category of the first edge site, a start time for the first DA and one or more parameters associated with the first DA. Step 1001 may correspond to step 901 of FIG. 9.

In step 1002, the method comprises determining if a first template DA exists for the category of the first edge site.

If a first template DA does not exist for the category of the first edge site, the method may pass to step 1003 in which the template selector 803 may be called (as will be described in more detail with reference to FIG. 11).

If a first template DA does exist for the category of the first edge site the method passes to step 1004 in which the first template DA, a fault list for the category of the first edge site, and a model list for the category of the first edge site are retrieved. Step 1004 may correspond to step 902 of FIG. 9.

In step 1005, the method comprises copying the template parameters (e.g., T1, T3$_{max}$, FHL$_{max}$ N$_{max}$) of the first template DA for use in generating the first DA.

In step 1006 the method comprises determining if there is already a DA record in the DA list 802 associated with the edge site identification.

If there is no existing DA record associated with the edge site identification, then a new DA record is created in step 1007. Step 1007 may also comprise populating the new DA record with the identification of the first template DA, the identification of the edge site, a new identification for the DA, a start time for the DA, a DA state (which may be initialized as "starting"), and an instance identification (which may be initiated at 1).

If a DA record associated with the edge site identification does exist, then the DA record is updated in step 1008. For example, the instance identification in the DA record may be increased by 1. Furthermore, the template identification in the DA record may be updated with the first template identification. Furthermore, the start time and DA state (which may be updated to "starting") in the DA record may be updated.

In step 1009, the method then comprises sending the creation request to initialize the first DA (for example, as described with reference to step 902). Step 1009 may correspond to step 903 of FIG. 9.

In step 1009, the method may also comprise starting a DA creation timer Tc.

In step 1010, the method comprises, after expiry of the DA creation timer Tc, determining if the first DA was successfully created. If the first DA was not successfully created (for example due to a lack of resources at the first edge site), the method passes to step 1011. In step 1011, the method comprises returning an indication of the failure to the first edge site. In such a scenario, the FMS of the first edge site, may assign a delegate site with more resources to handle the fault management instead. Step 1011 may also comprise deleting the DA record.

If the first DA was successfully created, the method passes to step 1012. In step 1012, the DA state in the DA record may be updated to "active". The method may then comprise waiting to receive a status report from the first DA.

In some examples, an update to a second DA may be requested as in step 1013 (for example by the statistics monitor 808). An update to a second DA may be requested, for example, when there is a policy violation with a fault handling rate or resource usage measure. The update request may comprise an edge site identification for a second edge site and one or more parameters with which the second DA at the second edge site is to be updated.

When a request for an update is received, the method passes to step 1014 in which the DA list is searched for a DA record matching the edge site identification. If no DA record is found, the method passes to step 1015 in which the method comprises determining a category of the second edge site based on the edge site identification. Step 1015 may then also comprise generating a second request to generate a second DA at the second edge site. The method may then pass to step 1002 and may continue to initiate creation of a second DA at the second edge site according to the second request.

If a DA record is found, the method passes to step 1016 in which the update is transmitted to the second edge site.

In some examples, a request to generate a DA may be triggered by the receipt of a status report from a third DA at a third edge site, as in step 1017. On receipt of the status report, the method may pass to step 1018 which comprises updating the DA status in the status report for the third DA to "terminating". Step 1018 may also comprise transmitting an indication that the third DA should be terminated to the third edge site.

In step 1019, the method comprises calling the template selector 803 to update the template for the edge site category based on the received status report. This step will be described in more detail with reference to FIG. 11.

In step 1020, the method comprises retrieving a third template DA associated with the edge site category of the third edge site. It will be appreciated that the third template DA may have been updated during step 1019 (as will be described with reference to FIG. 11).

The method may then pass to step 1005 and may continue through to step 1012 in order to generate a new DA at the third edge site.

Figure 11:
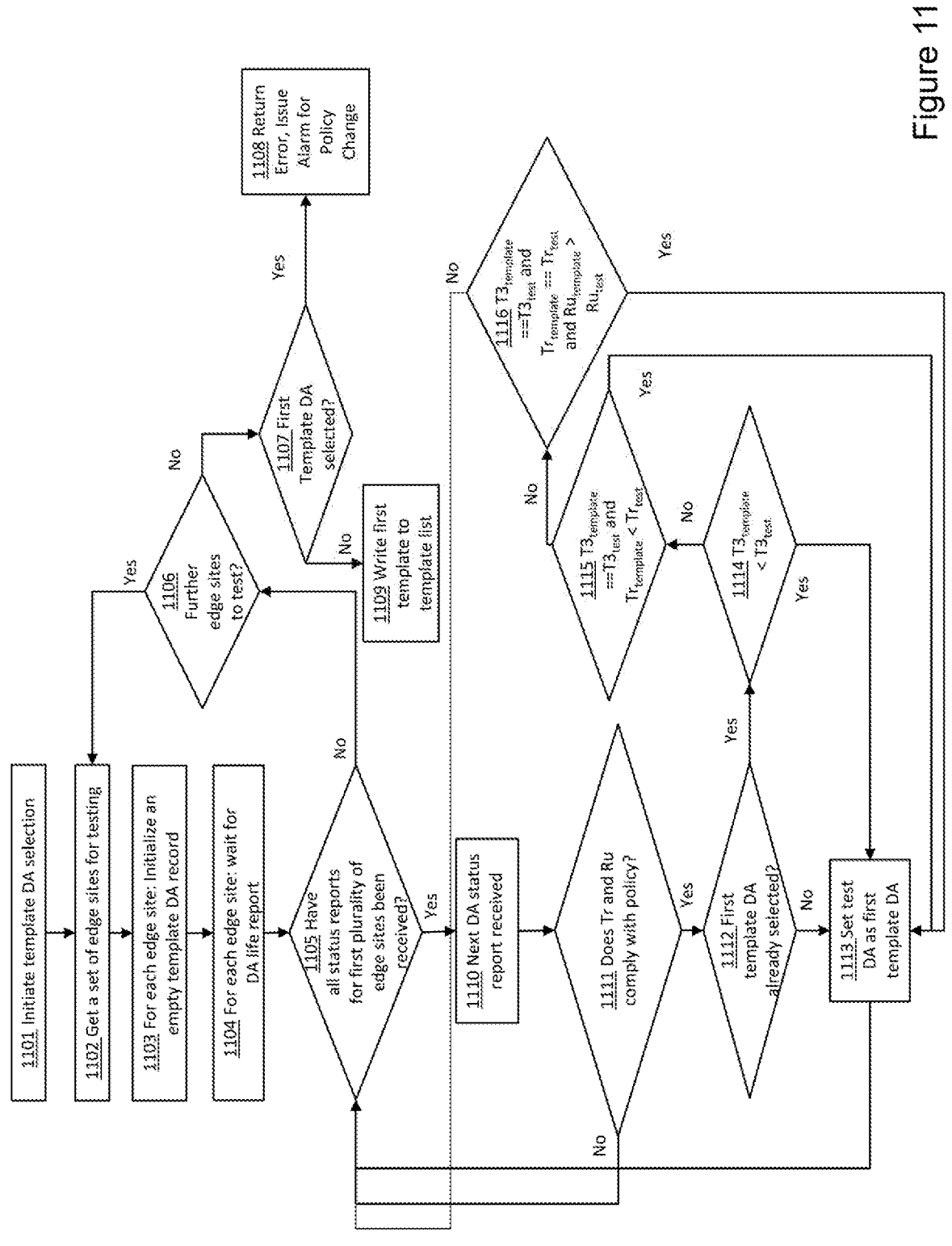
FIG. 11 illustrates a method of selecting and updating a template DA for an edge site category.

FIG. 11 illustrates a method of selecting and updating a template DA for an edge site category. The method of FIG. 11 may be performed by the DM 104, for example by the template selector 803. A template DA may be selected for each category of edge site in the network.

It will be appreciated that the initial DA template selection process (e.g., at creation of the network) may be a slow process. Therefore, the initial template selection process may be performed during the edge sites' testing phase, e.g., before they are onboarded, or in a testbed that simulates the edge sites. Either way, it may be assumed that there are multiple edge sites available for each category, for example, the DM may be able to retrieve a list of the edge sites from an Edge Site Inventory 809 (as illustrated in FIG. 8).

It may also be assumed that for each category of edge site, a fault list 805 and a model list 806 are available.

In step 1101, the method comprises initiating template DA selection for edge sites of a particular category. For example, step 1101 may be initiated by the DAM at step 1003 of FIG. 10. Step 1101 may be triggered at step 1003 of FIG. 10.

In step 1102, the method comprises selecting a first plurality of test edge sites of the particular category for testing. For example, a subset of the available edge sites of the particular category may be selected.

In step 1103, the method comprises initializing a first set of test DAs on the first plurality of test edge sites, wherein each test DA is initialized using test parameters.

The test parameters may be determined as follows:

A policy resource usage measure, PRu, for the edge site category may be obtained (for example, from the policy repository 807). The PRu may be for example 5% of all the resources.

An average resource requirement, ARr, for the FMMs may be determined by averaging the FMMs required resources as indicated in the model list.

A total available resources, Ret, for the edge site category may be obtained, for example, from the edge site inventory A value for N$_{max}$ may then be set as: int(Ret\*PRu/ARr)

A value for N$_{min}$ may then be set as N$_{min}$=int(N$_{max}$\*ratio), where ratio is a predefined percentage, e.g., 50%. This ratio may be decided by the fault handling rate, for example, requiring a higher fault handling rate may result in a higher $N_{min}$. This ratio may also be set based on previous experience.

The probability function for each possible fault at the edge site category may be obtained, for example from the fault list. Then it may be calculated whether there are any seasonal changes that can be accounted for using an environmental policy by summing the probability functions for all possible faults at each time period. A policy function Pof (N) for $T2^x$ may then be defined if there are seasonal changes.

A range of values to test may then be defined for the remaining test parameters T1, $T3_{max}$, and $FHL_{max}$. For each test edge site, these may then be assigned random values within the defined ranges.

Step 1103 may therefore comprise initialising the first set of DAs by generating template DAs using test parameters as defined above.

In step 1104 the method comprises waiting to receive a DA status report from each of the first plurality of test edge sites.

During step 1104 therefore, responsive to termination of each test DA, the method comprises receiving a status report for the test DA, wherein the status report of the test DA comprises an indication of a fault handling rate of the test DA and a resource usage of the test DA.

At step 1105, the method comprises checking whether all status reports for the first plurality of test edge sites have been received. If all status reports for the first plurality of test edge sites have been received, the method passes to step 1106 in which it is determined whether there are any further test edge sites in the category to test. If there are further test edge sites to test, the method passes back to step 1102 in which a second plurality of test edge sites are selected for testing.

If there are no further test edge sites in the category to test, the method passes to step 1107 in which it is determined whether a first template DA has been selected. If no first template DA has been selected, the method passes to step 1108 in which an alarm may be issued, or an error returned. Step 1108 may initiate a change in policy (e.g., a change in policy fault handling rate or policy resource usage measure).

If a first template DA has been selected, the method passes to step 1109 in which the first template DA may be written to the template list 804.

If at step 1105 it is determined that not all status reports for the first plurality of edge sites have been received, the method passes to step 1110 in which the next status report for a test DA at a test edge site is received.

It will also be appreciated, that at step 1019 of FIG. 10, the method of FIG. 11 may start at step 1110. By doing so, the status report of a terminated DA (after initialisation of the system), may be compared against a current template DA for the edge site category. If the status report of the termination DA is deemed better than the current template DA (by the method described below), it will replace the current template DA.

In other words, the method may comprise responsive to termination of a second DA, receiving a status report of the second DA wherein the status report of the second DA comprises an indication of a fault handling rate of the second DA and a resource usage of the second DA; and setting the second DA as a test DA.

Step 1111 comprises determining if the fault handling rate, Tr, of the test DA and the resource usage, Ru, of the test DA comply with a policy. For example, the policy may be that the fault handling rate, Tr, of the test DA must be above a policy fault handling rate, PTr, and the resource usage, Ru, of the test DA must be below a policy resource usage, PRu. The fault handling rate, Tr, and the resource usage Ru may be average values over a set number of time periods.

Responsive to the fault handling rate of the test DA or the resource usage of the test DA not complying with the policy, it is determined that the test DA cannot be used as the first template DA. The method therefore passes back to step 1105.

Responsive to the fault handling rate of the test DA and the resource usage of the test DA complying with the policy, the method passes to step 1112 in which it is determined if the first template DA has been selected yet.

Responsive to no first template DA having been selected, the method passes to step 1113 in which the test DA is set as the first template DA. The method then passes back to step 1105.

Responsive to a first template DA having already been selected, the method passes to step 1114 in which it is determined whether a lifespan, $T3_{test}$ of the test DA is greater than a lifespan, $T3_{template}$ of the first template DA. $T3_{test}$ may be determined by summing all of the T1s in the status report of the test DA.

Responsive to the lifespan of the test DA being greater than the lifespan of the first template DA, the method passes to step 1113 which comprises replacing the first template DA with the test DA.

Responsive to the lifespan of the test DA being less than or equal to the lifespan of the first template DA, the method passes to step 1115 in which it is determined if the lifespan of the test DA is equal to the lifespan of the first template DA and the fault handling rate of the test DA is greater than a fault handling rate of the first template DA.

Responsive to the lifespan of the test DA being equal to the lifespan of the first template DA and the fault handling rate of the test DA being greater than a fault handling rate of the first template DA, the method passes to step 1113 which comprises replacing the first template DA with the test DA.

Responsive to either the lifespan of the test DA being less than the lifespan of the first template DA, or the fault handling rate of the test DA being less than or equal to the fault handling rate of the first template DA, the method passes to step 1116. In step 1116 it is determined whether the lifespan of the test DA is equal to the lifespan of the first template DA; the fault handling rate of the test DA is equal to a fault handling rate of the first template DA, and the resource usage of the test DA is less than a resource usage of the first template DA.

Responsive to the lifespan of the test DA being equal to the lifespan of the first template DA; the fault handling rate of the test DA being equal to a fault handling rate of the first template DA, and the resource usage of the test DA being less than a resource usage of the first template DA, the method passes to step 1113 which comprises replacing the first template DA with the test DA.

Responsive to any one of: the lifespan of the test DA being less than the lifespan of the first template DA; the fault handling rate of the test DA being less than a fault handling rate of the first template DA, and the resource usage of the test DA being greater than or equal to a resource usage of the first template DA, it is determined that the test DA cannot be used as the first template DA. The method then passes back to step 1105.

Figure 12:
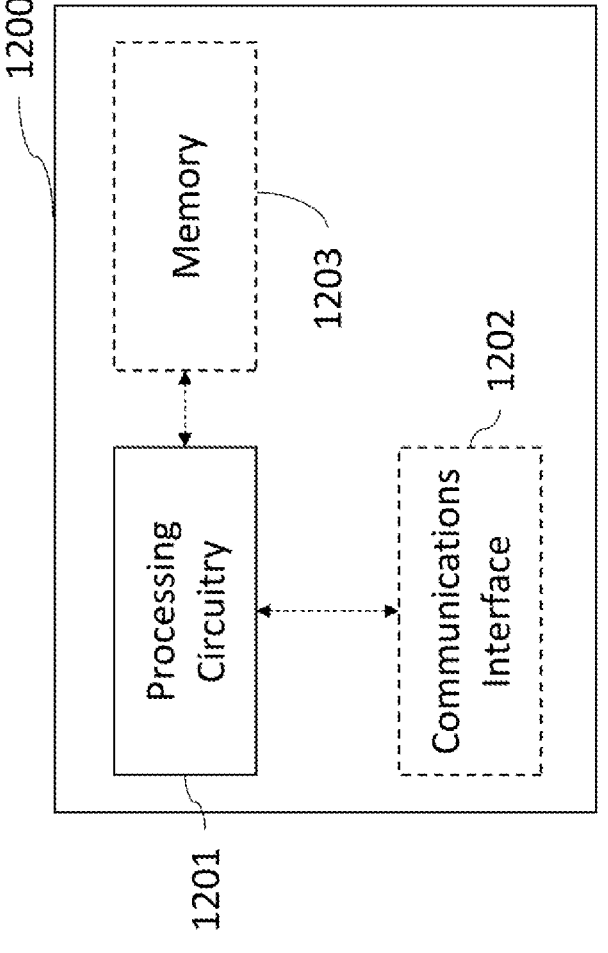
FIG. 12 illustrates an FMS comprising processing circuitry (or logic)

FIG. 12 illustrates an FMS 1200 comprising processing circuitry (or logic) 1201. The processing circuitry 1201 controls the operation of the FMS 1200 and can implement the method described herein in relation to an FMS 1200. The processing circuitry 1201 can comprise one or more processors, processing units, multi-core processors or modules that are configured or programmed to control the FMS 1200 in the manner described herein. In particular implementations, the processing circuitry 1201 can comprise a plurality of software and/or hardware modules that are each configured to perform, or are for performing, individual or multiple steps of the method described herein in relation to the FMS 1200.

Briefly, the processing circuitry 1201 of the FMS 1200 is configured to: in a deployment agent, DA: select the $N_{next}$ FMMs from a first set of FMMs based at least in part on respective probability functions associated with each of the first set of FMMs, wherein each respective probability function indicates how likely a fault associated with the respective FMM is to occur as a function of time; and initiate running of the $N_{next}$ FMMs at the FMS during the $i^{th}$ time period.

In some embodiments, the FMS 1200 may optionally comprise a communications interface 1202. The communications interface 1202 of the FMS 1200 can be for use in communicating with other nodes, such as other virtual nodes. For example, the communications interface 1202 of the FMS 1200 can be configured to transmit to and/or receive from other nodes requests, resources, information, data, signals, or similar. The processing circuitry 1201 of FMS 1200 may be configured to control the communications interface 1202 of the FMS 1200 to transmit to and/or receive from other nodes requests, resources, information, data, signals, or similar.

Optionally, the FMS 1200 may comprise a memory 1203. In some embodiments, the memory 1203 of the FMS 1200 can be configured to store program code that can be executed by the processing circuitry 1201 of the FMS 1200 to perform the method described herein in relation to the FMS 1200. Alternatively, or in addition, the memory 1203 of the FMS 1200 can be configured to store any requests, resources, information, data, signals, or similar that are described herein. The processing circuitry 1201 of the FMS 1200 may be configured to control the memory 1203 of the FMS 1200 to store any requests, resources, information, data, signals, or similar that are described herein.

Figure 13:
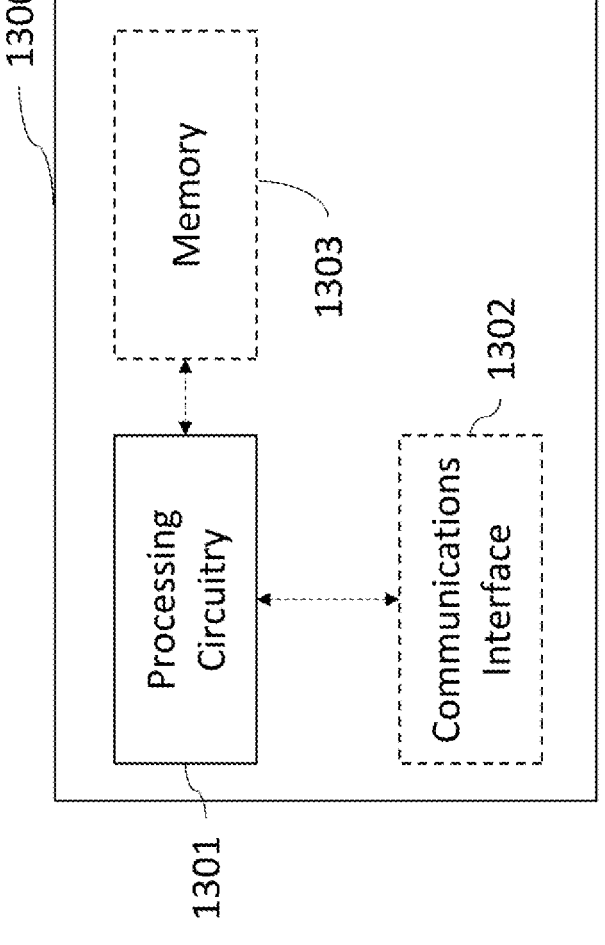
FIG. 13 illustrates a Deployment Manager comprising processing circuitry (or logic).

FIG. 13 illustrates a deployment manager 1300 comprising processing circuitry (or logic) 1301. The processing circuitry 1301 controls the operation of the deployment manager 1300 and can implement the method described herein in relation to a deployment manager 1300. The processing circuitry 1301 can comprise one or more processors, processing units, multi-core processors or modules that are configured or programmed to control the deployment manager 1300 in the manner described herein. In particular implementations, the processing circuitry 1301 can comprise a plurality of software and/or hardware modules that are each configured to perform, or are for performing, individual or multiple steps of the method described herein in relation to the deployment manager 1300.

Briefly, the processing circuitry 1301 of the deployment manager 1300 is configured to: receive a first request to create a first DA at a first edge site; obtain a first template DA, wherein the first template DA comprises a best performing previously terminated DA; and transmit, to the first edge site, a creation request to initialize the first DA, wherein the creation request indicates that the first DA should be initialized using a set of template parameters used by the first template DA.

In some embodiments, the deployment manager 1300 may optionally comprise a communications interface 1302. The communications interface 1302 of the deployment manager 1300 can be for use in communicating with other nodes, such as other virtual nodes. For example, the communications interface 1302 of the deployment manager 1300 can be configured to transmit to and/or receive from other nodes requests, resources, information, data, signals, or similar. The processing circuitry 1301 of deployment manager 1300 may be configured to control the communications interface 1302 of the deployment manager 1300 to transmit to and/or receive from other nodes requests, resources, information, data, signals, or similar.

Optionally, the deployment manager 1300 may comprise a memory 1303. In some embodiments, the memory 1303 of the deployment manager 1300 can be configured to store program code that can be executed by the processing circuitry 1301 of the deployment manager 1300 to perform the method described herein in relation to the deployment manager 1300. Alternatively, or in addition, the memory 1303 of the deployment manager 1300 can be configured to store any requests, resources, information, data, signals, or similar that are described herein. The processing circuitry 1301 of the deployment manager 1300 may be configured to control the memory 1303 of the deployment manager 1300 to store any requests, resources, information, data, signals, or similar that are described herein.

There is also provided a computer program comprising instructions which, when executed by processing circuitry (such as the processing circuitry 1201 of the edge site 1200 described earlier or the processing circuitry 1301 of the Deployment Manager described earlier), cause the processing circuitry to perform at least part of the method(s) described herein. There is provided a computer program product, embodied on a non-transitory machine-readable medium, comprising instructions which are executable by processing circuitry to cause the processing circuitry to perform at least part of the method(s) described herein. There is provided a computer program product comprising a carrier containing instructions for causing processing circuitry to perform at least part of the method(s) described herein. In some embodiments, the carrier can be any one of an electronic signal, an optical signal, an electromagnetic signal, an electrical signal, a radio signal, a microwave signal, or a computer-readable storage medium.

Embodiments described herein may therefore automate the deployment decisions of fault management ML models, reducing the effort for manual planning.

Embodiments described herein therefore provide a method for automatically and adaptively deploying FM ML models in edge sites of a cloud system. The method may take the probability of a fault occurring in an edge site into consideration with a goal of achieving a balance between the overall fault trapping rate and the model resource utilization.

The deployment decisions may be dynamic and may adapt to the actual status of the edge sites (e.g., the resource usage measure and the fault handling level at each edge site). These decisions may therefore evolve to achieve a balance between the fault handling rate and the resource usage measure at the edge sites over time.

Some embodiments may also take into account any environmental policy that may be applied at the edge sites. This may help to influence deployment decisions in advance to adapt to any seasonal traffic changes that are not already accounted for in the probability functions associated with the different faults.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, in a deployment manager, DM, for controlling one or more deployment agents, DAs, wherein each DA is configured to provide N Fault Management Models, FMMs, where N is an integer value, to run at an edge site in a cloud system during a first time period, the method comprising:

receiving a first request to create a first DA at a first edge site;

obtaining a first template DA, wherein the first template DA comprises a best performing previously terminated DA; and transmitting, to the first edge site, a creation request to initialize the first DA, wherein the creation request indicates that the first DA should be initialized using a set of template parameters used by the first template DA.

2. The method as claimed in claim 1, wherein the creation request further comprises one or more of: a status report of the template DA, an indication of a first set of FMMs and their associated respective probability functions, wherein each probability function is indicative of how likely a fault associated with the respective FMM to occur as a function of time, an indication of a set of possible faults that can occur at the first edge site, an identification of the edge site, and a DA identification.

3. The method as claimed in claim 1, wherein the set of template parameters comprises one or more of: a duration for the first time period, a maximum lifespan time period for which the first DA may run, a maximum fault handling level, a maximum N value, a minimum N value, and an environmental policy.

4. The method as claimed in claim 1, wherein the request to create the first DA comprises an indication that a previous DA at the first edge site has been terminated.

5. The method as claimed in claim 1, wherein the step of obtaining the first template DA comprises:

initializing a first set of test DAs on a first plurality of test edge sites, wherein each test DA is initialized using test parameters;

for each test DA:

responsive to termination the test DA, receiving a status report for the test DA, wherein the status report of the test DA comprises an indication of a fault handling rate of the test DA and a resource usage of the test DA;

determining if the fault handling rate of the test DA and the resource usage of the test DA comply with a policy;

responsive to the fault handling rate of the test DA and the resource usage of the test DA complying with the policy, determining if the first template DA has been selected yet; and responsive to no first template DA having been selected, setting the test DA as the first template DA.

6. The method as claimed in claim 5, further comprising:

for each of the first set of test DAs:

responsive to the fault handling rate or the resource usage not complying with the policy, determining that the test DA cannot be used as the first template DA.

7. The method as claimed in claim 5, further comprising:

for each of the first set of test DAs:

responsive to the first template having already been selected, determining whether a lifespan of the test DA is greater than a lifespan of the first template DA; and responsive to the lifespan of the test DA being greater than the lifespan of the first template DA, replacing the first template DA with the test DA.

8. The method as claimed in claim 7, further comprising:

for each of the first set of test DAs:

responsive to the lifespan of the test DA being less than or equal to the lifespan of the first template DA, determining if the lifespan of the test DA is equal to the lifespan of the first template DA and the fault handling rate of the test DA is greater than a fault handling rate of the first template DA; and responsive to either the lifespan of the test DA being less than the lifespan of the first template DA or the fault handling rate of the test DA being less than or equal to the fault handling rate of the first template DA, determining whether the lifespan of the test DA is equal to the lifespan of the first template DA, the fault handling rate of the test DA is equal to a fault handling rate of the first template DA, and the resource usage of the test DA is less than a resource usage of the first template DA.

9. The method as claimed in claim 8, further comprising:

for each of the first set of test DAs:

responsive to the lifespan of the test DA being equal to the lifespan of the first template DA and the fault handling rate of the test DA being greater than a fault handling rate of the first template DA, replacing the first template DA with the test DA.

10. The method as claimed in claim 9, further comprising:

for each of the first set of test DAs:

responsive to the lifespan of the test DA being equal to the lifespan of the first template DA, the fault handling rate of the test DA being equal to a fault handling rate of the first template DA, and the resource usage of the test DA being less than a resource usage of the first template DA, replacing the first template DA with the test DA.

11. The method as claimed in claim 9, further comprising:

for each of the first set of test DAs:

responsive to any one of: the lifespan of the test DA being less than the lifespan of the first template DA, the fault handling rate of the test DA being less than a fault handling rate of the first template DA, and the resource usage of the test DA being greater than or equal to a resource usage of the first template DA, determining that the test DA cannot be used as the first template DA.

12. The method as claimed in claim 5, further comprising:

responsive to termination of a second DA, receiving a status report of the second DA wherein the status report of the second DA comprises an indication of a fault handling rate of the second DA and a resource usage of the second DA; and setting the second DA as a test DA.

13. The method as claimed in claim 1, further comprising:

for each third DA in one or more active third DAs, obtaining a fault handling rate of the third DA associated with running $N_3$ FMMs during the first time period, where $N_3$ is an integer value;

determining an average fault handling rate of the third DAs based on the fault handling rates for each third DA; and responsive to the average fault handling rate of the third DAs being below a policy fault handling rate, transmitting a first update request to each third DA to request that the third DA select M, where M is an integer value, more FMMs for a next time period.

14. The method as claimed in claim 1, further comprising:

for each fourth DA in one or more active fourth DAs, obtaining a resource usage measure of the fourth DA associated with running $N_4$ FMMs during the first time period, where $N_4$ is an integer value;

determining an average resource usage measure of the fourth DAs based on the resource usage measure for each fourth DA; and responsive to the average resource usage measure of the fourth DAs being above a policy resource usage measure, transmitting a second update request to each fourth DA to request that each fourth DA reduce the number of FMMs by Y for a next time period.

15. The method as claimed in claim 1, further comprising:

obtaining a plurality of first template DAs, one for each of a plurality of categories of edge sites.

16. A deployment manager, DM, for controlling one or more deployment agents, DAs, wherein each DA is configured to provide N Fault Management Models, FMMs, where N is an integer value, to run at an edge site in a cloud system during a first time period; the DM comprising processing circuitry configured to cause the DM to:

receive a first request to create a first DA at a first edge site;

obtain a first template DA, wherein the first template DA comprises a best performing previously terminated DA; and transmit, to the first edge site, a creation request to initialize the first DA, wherein the creation request indicates that the first DA should be initialized using a set of template parameters used by the first template DA.

17. A non-transitory computer storage medium, storing a computer program comprising instructions, which when executed on at least one processor, cause the processor to perform a method for controlling one or more deployment agents, DAs, wherein each DA is configured to provide N Fault Management Models, FMMs, where N is an integer value, to run at an edge site in a cloud system during a first time period, the method comprising:

receiving a first request to create a first DA at a first edge site;

obtaining a first template DA, wherein the first template DA comprises a best performing previously terminated DA; and transmitting, to the first edge site, a creation request to initialize the first DA, wherein the creation request indicates that the first DA should be initialized using a set of template parameters used by the first template DA.

\* \* \* \* \*